(12) United States Patent
Kubo et al.

(10) Patent No.: US 6,886,356 B2
(45) Date of Patent: May 3, 2005

(54) CAR AIR-CONDITIONING SYSTEM

(75) Inventors: Mamoru Kubo, Gunma (JP);
Shigeharu Sasaki, Gunma (JP);
Kazuhisa Otagaki, Gunma (JP);
Susumu Takagi, Gunma (JP); Kenzo Watanabe, Tokyo (JP)

(73) Assignees: Sanyo Electric Co., Ltd., Moriguchi (JP); Sanyo Electric Air Conditioning Co., Ltd., Ashikaga (JP); Fuji Jukogyo Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/276,326
(22) PCT Filed: Mar. 27, 2002
(86) PCT No.: PCT/JP02/02949
§ 371 (c)(1),
(2), (4) Date: Jun. 16, 2003
(87) PCT Pub. No.: WO02/078990
PCT Pub. Date: Oct. 10, 2002

(65) Prior Publication Data
US 2004/0025525 A1 Feb. 12, 2004

(30) Foreign Application Priority Data
Mar. 28, 2001 (JP) ........................................ 2001-093899

(51) Int. Cl.[7] ................................................. F25B 1/00
(52) U.S. Cl. ........................................... 62/230; 62/236
(58) Field of Search ......................... 62/230, 236, 133, 62/134, 231, 244

(56) References Cited
U.S. PATENT DOCUMENTS 5,086,266 A * 2/1992 Shiga et al. ................... 322/28
5,191,766 A * 3/1993 Vines ............................ 60/619

(Continued)

FOREIGN PATENT DOCUMENTS

| EP | 000015462 A1 | * | 9/1990 |
| JP | 352027137 A | * | 3/1977 |
| JP | 358000030 A | * | 1/1983 |
| JP | 6-227243 | | 8/1994 |
| JP | 7-95797 | | 4/1995 |
| JP | 7-172159 | | 7/1995 |
| JP | 2000-270401 | | 9/2000 |

OTHER PUBLICATIONS

Patent Abstracts of Japan vol. 2000, No. 12 & JP 2000 270401 A, Sep. 29, 2000 *Abstract* (cited in PCT search report).
Patent Abstracts of Japan vol. 1997, No. 07, & JP 9 076740 A, Mar. 25, 1997 *Abstract*.
Patent Abstracts of Japan vol. 1995, No. 07 & JP 7 095797 A, Apr. 07, 1995 *Abstract* (cited in PCT search report).

*Primary Examiner*—Harry Tanner
*Assistant Examiner*—Mohammad M. Ali
(74) *Attorney, Agent, or Firm*—Armstrong, Kratz, Quintos, Hanson & Brooks, LLP

(57) ABSTRACT

There is provided an automotive air conditioning system, which is free from troubles in traveling itself caused by power consumption in air conditioning means in an automobile having storage means, power generation means for charging the storage means, and air conditioning means having an electric compressor driven by feeding from the storage means. Control means calculates a permissible power consumption increment in the air conditioning means by adding a permissible power generation increment to a permissible discharging current increment on tha basis of the permissible power generation increment allowable in the power generation means and the permissible discharging current increment allowable in the storage means to increase power consumption of the air conditioning means within the range of the permissible power consumption increment and to increase power generation of the power generation means within the range of the permissible power generation increment according to an increment of power consumption of the air conditioning means.

13 Claims, 15 Drawing Sheets

U.S. PATENT DOCUMENTS

| | | | |
|---|---|---|---|
| 5,375,429 A | * 12/1994 | Tokizaki et al. | 62/235.1 |
| 5,651,260 A | 7/1997 | Goto et al. | |
| 6,048,288 A | * 4/2000 | Tsujii et al. | 477/5 |
| 6,178,760 B1 | * 1/2001 | Tanaka et al. | 62/154 |
| 6,208,034 B1 | * 3/2001 | Yamaguchi | 290/40 C |
| 6,314,347 B1 | * 11/2001 | Kuroda et al. | 701/22 |
| 6,362,580 B1 | * 3/2002 | Omata et al. | 318/139 |
| 6,373,206 B1 | * 4/2002 | Morimoto et al. | 318/139 |
| 6,394,210 B2 | * 5/2002 | Matsuda et al. | 180/68.1 |
| 6,492,741 B1 | * 12/2002 | Morimoto et al. | 290/40 C |
| 6,534,210 B2 | * 3/2003 | Luken et al. | 429/13 |
| 2001/0040061 A1 | * 11/2001 | Matuda et al. | 180/68.2 |

* cited by examiner

CAR AIR-CONDITIONING SYSTEM

BACKGROUND OF THE INVENTION

1. Field of the Invention

The present invention relates to an automotive air conditioning system for use in an automobile having storage means, power generation means for charging the storage means, and air conditioning means having an electric compressor driven by feeding from the storage means.

2. Related Background Art

Conventionally, a car air-conditioner (air conditioning means) for use in a general automobile has had a compressor driven by a fuel engine (an internal combustion engine). High-temperature gas refrigerant, which has been discharged from the compressor and flowed into an exterior unit heat exchanger, radiates heat through heat exchanges with an air outside the passenger compartment caused by an exterior unit blower and is condensed to a liquid. Thereafter it flows into an interior unit heat exchanger arranged inside the passenger compartment via an expansion valve. The liquid refrigerant evaporates there and absorbs heat from circumambient air, thereby taking cooling action. This interior unit heat exchanger air-conditions by taking the heat out of the passenger compartment with heat exchanges to the air of the inside of the passenger compartment circulated by the interior unit blower. Then, refrigerant from the interior unit heat exchanger returns to the compressor and the refrigerating cycle is repeated.

This type of car air-conditioner is provided with a control unit, which turns off a rotation of the compressor when the passenger compartment is air-cooled up to the lower limit temperature among the given upper limit temperature and lower limit temperature set at the top and bottom of the preset temperatures. Then, if the inside temperature of the passenger compartment rises up and reaches the upper limit temperature, the control unit restarts air-cooling the passenger compartment by turning on the compressor. In this manner, the conventional system air-cools the passenger compartment, having a heating action from the heater added, thereby air-conditions the passenger compartment at a preset temperature at all seasons.

On the other hand, recently the development of electric vehicles has been accelerated by questions of the global environmental pollution problems caused by exhaust emission from those fuel engine vehicles. The electric vehicles include a pure electric vehicle (PEV) with a battery (in-vehicle battery) mounted on the automobile, which runs by driving a traveling motor powered by the in-vehicle battery, in addition to a series hybrid vehicle running with charging an in-vehicle battery using power generated by a fuel engine and with driving a traveling motor using power fed from the battery, a parallel hybrid vehicle running with cooperation between a traveling motor and a fuel engine, a series and parallel hybrid vehicle (HEV) having both functions of the series and parallel hybrid vehicles, and a fuel cell powered vehicle (FCEV) running with charging an in-vehicle battery using power generated by a fuel cell and with driving a traveling motor using power fed from the battery.

In air-conditioning a passenger compartment like the above in the electric vehicle, an electric compressor driven by feeding from the in-vehicle battery is used as a compressor for the air conditioning means (car air-conditioner). If the in-vehicle battery is discharged by power consumption in the electric compressor, however, it may cause such a problem that traveling itself is disrupted.

Also in a general fuel engine vehicle, an alternator driven by an engine generates power and the power is used for charging an in-vehicle battery. Therefore, if a compressor for air conditioning means is driven as an electric compressor by using the in-vehicle battery also in this case, a performance control (frequency control) of the compressor can be easily performed and more comfortable air conditioning in the passenger compartment can be achieved. Nevertheless, if the in-vehicle battery is discharged due to power consumption in the electric compressor, an engine control unit, a change gear control unit, and an igniter malfunction, thereby disrupting the traveling itself.

As a solution to these problems, there will be a way of increasing the capacities of the in-vehicle battery, the fuel engine, and the fuel cell up to the levels enough to cover the demand of the power consumption in the electric compressor. It, however, causes a steep rise in the cost and an increase in the weight of the automobile itself. Therefore, it rather causes a deterioration of its traveling performance itself or an increase of auto emission.

To solve these problems of the conventional art, the present invention is provided. Therefore, there is provided an automotive air conditioning system, which is free from troubles in traveling itself caused by power consumption in air conditioning means in an automobile having storage means, power generation means for charging the storage means, and air conditioning means having an electric compressor driven by feeding from the storage means.

SUMMARY OF THE INVENTION

In accordance with one aspect of the present invention, there is provided an automotive air conditioning system, which is for use in an automobile having storage means, power generation means for charging the storage means, and air conditioning means having an electric compressor driven by feeding from the storage means, comprising control means for controlling power generation of the power generation means and an operation of the air conditioning means, wherein the control means calculates a permissible power consumption increment in the air conditioning means by adding a permissible power generation increment to a permissible discharging current increment on tha basis of the permissible power generation increment allowable in the power generation means and the permissible discharging current increment allowable in the storage means to increase power consumption of the air conditioning means within the range of the permissible power consumption increment and to increase power generation of the power generation means within the range of the permissible power generation increment according to an increment of power consumption of the air conditioning means.

According to the automotive air conditioning system of the present invention, it is for use in an automobile having storage means, power generation means for charging the storage means, and air conditioning means having an electric compressor driven by feeding from the storage means and comprises control means for controlling power generation of the power generation means and an operation of the air conditioning means, wherein the control means calculates a permissible power consumption increment in the air conditioning means by adding a permissible power generation increment to a permissible discharging current increment on tha basis of the permissible power generation increment allowable in the power generation means and the permissible discharging current increment allowable in the storage means to increase power consumption of the air conditioning means within the range of the permissible power consumption increment and to increase power generation of the power generation means within the range of the permissible power generation increment according to an increment of power consumption of the air conditioning means, by which the increase of the power consumption of the air conditioning means is limited to remain within the range of the permissible power consumption increment calculated by adding the permissible discharging current increment in the storage means to the permissible power generation increment in the power generation means.

This prevents the disadvantage of the traveling malfunction or disabled traveling which may be caused by a decrease of a storage amount or discharging to the fullest of the storage means due to power consumption of the air conditioning means. In addition, the power generation of the power generation means is increased within the range of the permissible power generation increment according to an increment of power consumption of the air conditioning means, thereby ensuring as high air conditioning capability of the air conditioning means as possible, by which a decrease of the air conditioning performance inside the passenger compartment can be prevented or minimized. Particularly, the permissible discharging current increment in the storage means is also considered in the increase of power consumption of the air conditioning means in this condition. Therefore, it becomes possible to discharge the storage means within the allowable range so as to maximize the air conditioning capability of the air conditioning means under such circumstances that traveling loads are reduced, thereby achieving more comfortable air conditioning in the passenger compartment.

Furthermore, in accordance with another aspect of the present invention, there is provided an automotive air conditioning system, which is for use in an automobile having storage means, power generation means for charging the storage means, and air conditioning means having an electric compressor driven by feeding from the storage means, comprising control means for controlling power generation of the power generation means and an operation of the air conditioning means, wherein the control means calculates a permissible power consumption increment in the air conditioning means by adding a permissible power generation increment to a permissible discharging current increment on tha basis of the permissible power generation increment allowable in the power generation means and the permissible discharging current increment allowable in the storage means to increase power consumption of the air conditioning means within the range of the permissible power consumption increment and to increase power generation of the power generation means by an excess of an increment of power consumption of the air conditioning means over the permissible discharging current increment.

According to the automotive air conditioning system of the present invention, it is for use in an automobile having storage means, power generation means for charging the storage means, and air conditioning means having an electric compressor driven by feeding from the storage means and comprises control means for controlling power generation of the power generation means and an operation of the air conditioning means, wherein the control means calculates a permissible power consumption increment in the air conditioning means by adding a permissible power generation increment to a permissible discharging current increment on tha basis of the permissible power generation increment allowable in the power generation means and the permissible discharging current increment allowable in the storage means to increase power consumption of the air conditioning means within the range of the permissible power consumption increment and to increase power generation of the power generation means by an excess of an increment of power consumption of the air conditioning means over the permissible discharging current increment, by which the increase of the power consumption of the air conditioning means is limited to remain within the range of the permissible power consumption increment calculated by adding the permissible discharging current increment in the storage means to the permissible power generation increment in the power generation means.

This prevents the disadvantage of the traveling malfunction or disabled traveling which may be caused by a decrease of a storage amount or discharging to the fullest of the storage means due to power consumption of the air conditioning means. In addition, the power generation of the power generation means is increased by the excess of an increment of power consumption of the air conditioning means over the permissible discharging current increment, thereby ensuring as high air conditioning capability of the air conditioning means as possible, by which a decrease of the air conditioning performance inside the passenger compartment can be prevented or minimized. Particularly, the permissible discharging current increment in the storage means is also considered in an increase of power consumption of the air conditioning means in this condition. Therefore, it becomes possible to discharge the storage means within the allowable range so as to maximize the air conditioning capability of the air conditioning means under such circumstances that traveling loads are reduced, thereby achieving more comfortable air conditioning in the passenger compartment. Furthermore, the increase in the power generation is limited to the excess of an increment of power consumption of the air conditioning means over the permissible discharging current increment, by which it becomes possible to minimize the increase in the consumption energy for increasing the power generation in the power generation means.

In the above each aspect of the invention, the automotive air conditioning system of the present invention further comprises driving means for driving the power generation means, wherein the control means compares margin power generation that the power generation means can output further with margin horsepower that the driving means can output further and considers a lower value to be the permissible power generation increment.

According to the automotive air conditioning system of the present invention, it further comprises driving means for driving the power generation means in addition to the above each aspect of the invention, wherein the control means compares the margin power generation that the power generation means can output further with the margin horsepower that the driving means can output further and considers a lower value to be the permissible power generation increment, by which it becomes possible to calculate the permissible power consumption increment of the air conditioning means from a more accurate permissible power generation increment obtained after considering the margin horsepower of the driving means for driving the power generation means and to execute a control of an increase in the power consumption of the air conditioning means.

Furthermore, in the above, the automotive air conditioning system of the present invention comprises the control means which calculates a margin-power utilization ratio fluctuating within a range of 0 to 1 in proportion to a value obtained by subtracting the margin horsepower from a value of the permissible power generation increment plus the permissible discharging current increment and calculates the permissible power consumption increment by multiplying the permissible power generation increment plus the permissible discharging current increment by the margin-power utilization ratio.

According to the automotive air conditioning system of the present invention, the control means in the above further calculates a margin-power utilization ratio fluctuating within a range of 0 to 1 in proportion to a value obtained by subtracting the margin horsepower from a value of the permissible power generation increment plus the permissible discharging current increment and calculates the permissible power consumption increment by multiplying the permissible power generation increment plus the permissible discharging current increment by the margin-power utilization ratio, by which the permissible power consumption increment decreases if a proportion of the margin horsepower is high relative to the value of the permissible power generation increment plus the permissible discharging current increment and the margin-power utilization ratio is low, while the permissible power consumption increment increases if the proportion of the margin horsepower is low and the margin-power utilization ratio is high to the contrary.

With this, in a case where an output of the driving means for driving the power generation means sharply increases up to the maximum horsepower and the margin horsepower sharply decreases, the value of the permissible power consumption increment decreases in advance if it has a significant effect, thereby enabling an accurate control of the power consumption of the air conditioning means according to driving conditions of the driving means for driving the power generation means.

In accordance with still another aspect of the invention, there is provided an automotive air conditioning system, which is for use in an automobile having storage means, power generation means for charging the storage means, and air conditioning means having an electric compressor driven by feeding from the storage means, comprising control means for controlling power generation of the power generation means and an operation of the air conditioning means, wherein the control means calculates a permissible power generation increment allowable in the power generation means to increase power consumption of the air conditioning means within the range of the permissible power generation increment and to increase power generation of the power generation means according to an increment of power consumption of the air conditioning means.

According to the automotive air conditioning system of the present invention, it is for use in an automobile having storage means, power generation means for charging the storage means, and air conditioning means having an electric compressor driven by feeding from the storage means and comprises control means for controlling power generation of the power generation means and an operation of the air conditioning means, wherein the control means calculates a permissible power generation increment allowable in the power generation means to increase power consumption of the air conditioning means within the range of the permissible power generation increment and to increase power generation of the power generation means according to an increment of power consumption of the air conditioning means, by which an increase of the power consumption of the air conditioning means is limited to remain at least within the range of the permissible power generation increment of the power generation means.

This prevents the disadvantage of the traveling malfunction or disabled traveling which may be caused by a decrease of a storage amount or discharging to the fullest of the storage means due to an electric discharge of the storage means caused by power consumption of the air conditioning means. In addition, the power generation of the power generation means is increased according to an increment of power consumption of the air conditioning means, thereby ensuring as high air conditioning capability of the air conditioning means as possible, by which a decrease of the air conditioning performance inside the passenger compartment can be prevented or minimized.

Furthermore, in the above aspect of the automotive air conditioning system of the present invention, it further comprises driving means for driving the power generation means, wherein the control means compares margin power generation that the power generation means can output further with margin horsepower that the driving means can output further and considers a lower value to be the permissible power generation increment.

According to the automotive air conditioning system of the present invention, it further comprises driving means for driving the power generation means in the above, wherein the control means compares margin power generation that the power generation means can output further with margin horsepower that the driving means can output further and considers a lower value to be the permissible power generation increment, by which it becomes possible to calculate a more accurate permissible power generation increment obtained after considering the margin horsepower of the driving means for driving the power generation means and to execute a control of an increase in the power consumption of the air conditioning means.

Furthermore, in accordance with still another aspect of the present invention, there is provided an automotive air conditioning system, which is for use in an automobile having storage means, power generation means for charging the storage means, and air conditioning means having an electric compressor driven by feeding from the storage means, comprising current detecting means for detecting a discharging current value from the storage means and control means for controlling power generation of the power generation means, wherein, if the discharging current value exceeds a given permissible value, the control means increases the power generation of the power generation means from a given initial value on the basis of the discharging current value from the storage means detected by the current detecting means.

According to the automotive air conditioning system of the present invention, it is for use in an automobile having storage means, power generation means for charging the storage means, and air conditioning means having an electric compressor driven by feeding from the storage means and comprises current detecting means for detecting a discharging current value from the storage means and control means for controlling power generation of the power generation means, wherein, if the discharging current value exceeds a given permissible value, the control means increases the power generation of the power generation means from a given initial value on the basis of the discharging current value from the storage means detected by the current detecting means, thereby enabling an effective elimination of the disadvantage of the traveling malfunction or disabled traveling which may be caused by a decrease of a storage amount or discharging to the fullest of the storage means due to power consumption of the air conditioning means. Particularly, it causes the storage means to be discharged up to a permissible value, by which it becomes possible to discharge the storage means within the allowable range so as to maximize the air conditioning capability of the air conditioning means under the conditions of low traveling loads, thereby achieving more comfortable air conditioning in the passenger compartment.

In the above, the automotive air conditioning system of the present invention comprises the control means controlling power generation of the power generation means so that the discharging current value decreases to a given return value lower than the permissible value and returning the power generation of the power generation means to the initial value if the power generation concerned decreases to a level lower than the initial value.

According to the automotive air conditioning system of the present invention, the control means controls power generation of the power generation means so that the discharging current value decreases to a given return value lower than the permissible value and returns the power generation of the power generation means to the initial value if the power generation concerned decreases to a level lower than the initial value, thereby eliminating the disadvantage of a decrease of a storage amount or discharging to the fullest of the storage means while the power generation of the power generation means is controlled without any problem.

Furthermore, in the above, the automotive air conditioning system of the present invention comprises the control means controlling an operation of the air conditioning means and executing a control of stopping an increase of power consumption of the air conditioning means or of decreasing the power consumption concerned if the power generation of the power generation means reaches an upper limit.

According to the automotive air conditioning system of the present invention, the control means further controls an operation of the air conditioning means and executes a control of stopping an increase of power consumption of the air conditioning means or of decreasing the power consumption concerned if the power generation of the power generation means reaches an upper limit, by which it becomes possible to secure as large air conditioning capability of the air conditioning means as possible while it is possible to reliably prevent the disadvantage of the traveling malfunction or disabled traveling which may be caused by a decrease of a storage amount or discharging to the fullest of the storage means due to power consumption of the air conditioning means.

In accordance with still another aspect of the present invention, there is provided an automotive air conditioning system, which is for use in an automobile having storage means, power generation means for charging the storage means, and air conditioning means having an electric compressor driven by feeding from the storage means, comprising current detecting means for detecting a charging current value to the storage means and control means for controlling power generation of the power generation means, wherein, if the charging current value concerned is lower than a given lower limit, the control means increases the power generation of the power generation means from a given initial value on the basis of the charging current value to the storage means detected by the current detecting means.

According to the automotive air conditioning system of the present invention, it is for use in an automobile having storage means, power generation means for charging the storage means, and air conditioning means having an electric compressor driven by feeding from the storage means and comprises current detecting means for detecting a charging current value to the storage means and control means for controlling power generation of the power generation means, wherein, if the charging current value concerned is lower than a given lower limit, the control means increases the power generation of the power generation means from a given initial value on the basis of the charging current value to the storage means detected by the current detecting means. This prevents the storage means to be uncharged due to power consumption of the air conditioning means, thereby effectively eliminating the disadvantage of the traveling malfunction or disabled traveling which may be caused by a decrease of a storage amount or discharging to the fullest of the storage means.

In the above, the automotive air conditioning system of the present invention comprises the control means controlling power generation of the power generation means so that the charging current value increases to a given return value higher than the lower limit and returning the power generation of the power generation means to the initial value if the power generation concerned decreases to a level lower than the initial value.

According to the automotive air conditioning system of the present invention, the control means further controls power generation of the power generation means so that the charging current value increases to a given return value higher than the lower limit and returns the power generation of the power generation means to the initial value if the power generation concerned decreases to a level lower than the initial value, thereby ensuring charging the storage means and eliminating the disadvantage of a decrease of a storage amount or discharging to the fullest of the storage means while the power generation of the power generation means is controlled without any problem.

In the above, the automotive air conditioning system of the present invention comprises the control means controlling an operation of the air conditioning means and executing a control of stopping an increase of power consumption of the air conditioning means or of decreasing the power consumption concerned if the power generation of the power generation means reaches an upper limit.

According to the automotive air conditioning system of the present invention, the control means in the above further controls an operation of the air conditioning means and executes a control of stopping an increase of power consumption of the air conditioning means or of decreasing the power consumption concerned if the power generation of the power generation means reaches an upper limit, by which it becomes possible to secure as large air conditioning capability of the air conditioning means as possible while it is possible to reliably prevent the disadvantage of the traveling malfunction or disabled traveling which may be caused by a decrease of a storage amount or discharging to the fullest of the storage means due to power consumption of the air conditioning means.

Furthermore, in the automotive air conditioning system of the present invention, the automobile is an electric vehicle running with a traveling motor fed by the storage means in the above each aspect of the invention.

According to the automotive air conditioning system of the present invention, the automobile is an electric vehicle running with a traveling motor fed by the storage means in the above each aspect of the invention, by which it is possible to effectively eliminate an adverse effect of the operation of the air conditioning means on traveling of the electric vehicle while the air conditioning means smoothly performs air conditioning in the passenger compartment of the electric vehicle.

DETAILED DESCRIPTION OF THE PREFERRED EMBODIMENTS

The preferred embodiments of the present invention will now be described in detail hereinafter with reference to the accompanying drawings. Referring to FIGS. 1, 2, 3, 4, and 5, there are shown a constitutional diagram of an automobile 1 as an embodiment to which is applied an automotive air conditioning system of the present invention, a constitutional diagram of a driving system of the automobile shown in FIG. 1, a constitutional diagram of an air conditioning unit (AC) as air conditioning means in the present invention, a refrigerant circuit diagram of the air conditioning unit 9, and a block diagram of a control system of the automobile 1 including the automotive air conditioning system of the present invention, respectively.

Figure 1:
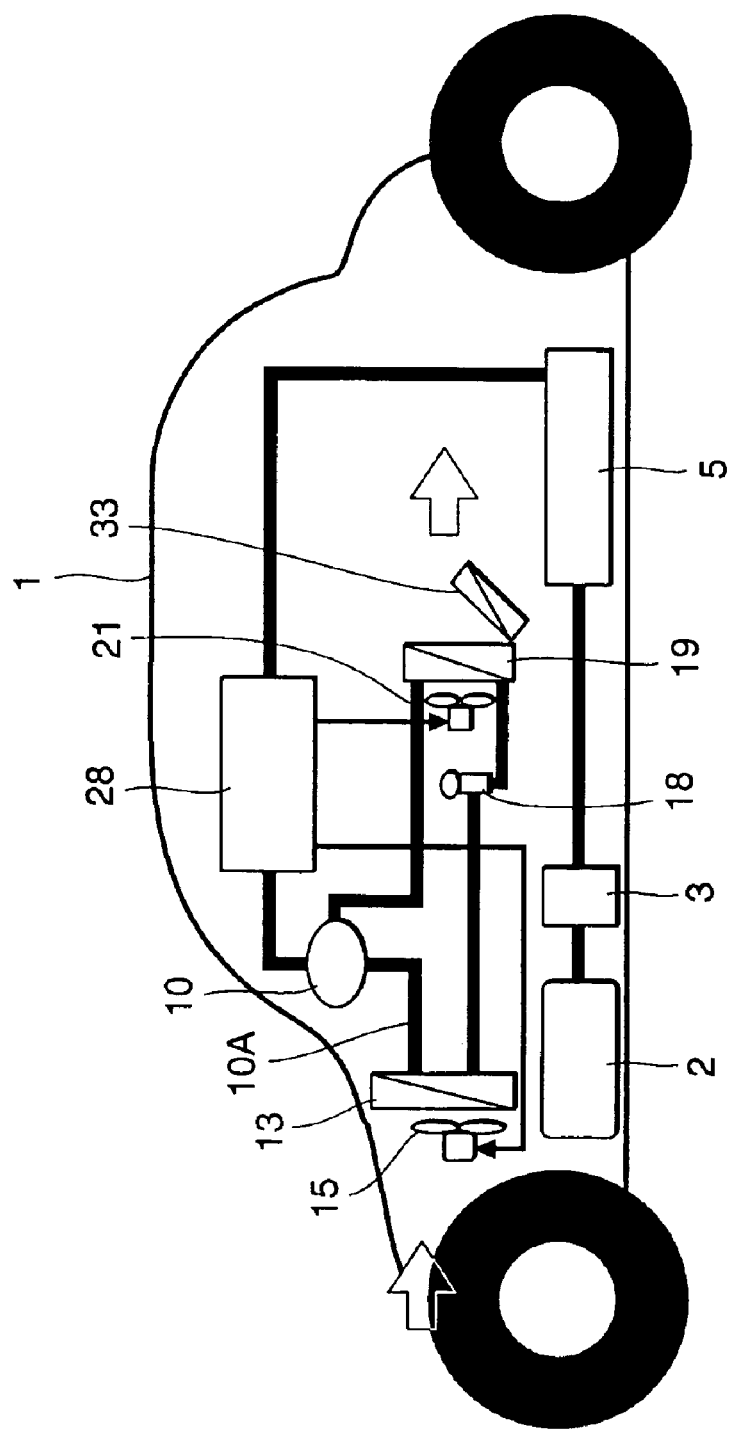
FIG. 1 is a constitutional diagram of a hybrid vehicle as an embodiment to which is applied an automotive air conditioning system of the present invention.
Figure 2:
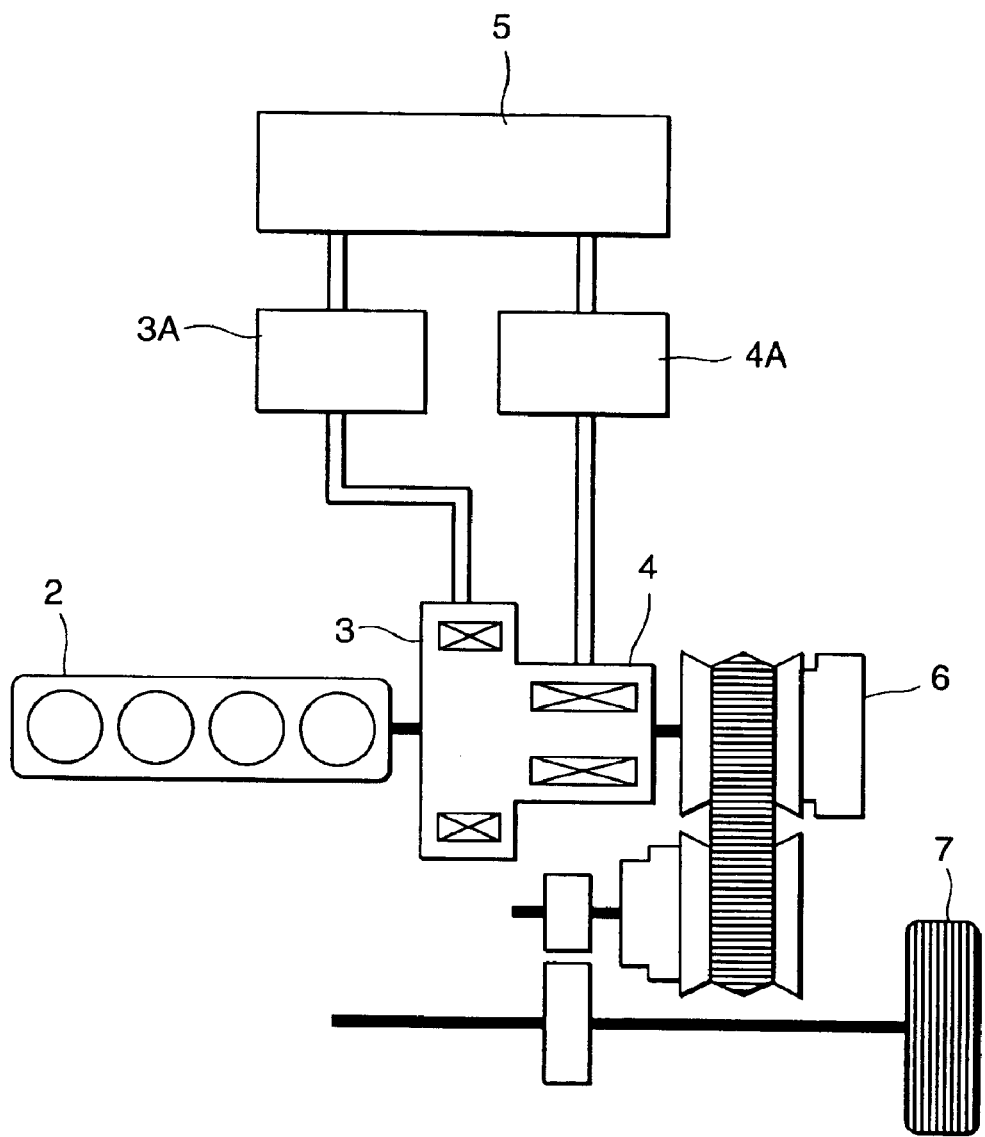
FIG. 2 is a constitutional diagram of a driving system of the automobile shown in FIG. 1.
Figure 3:
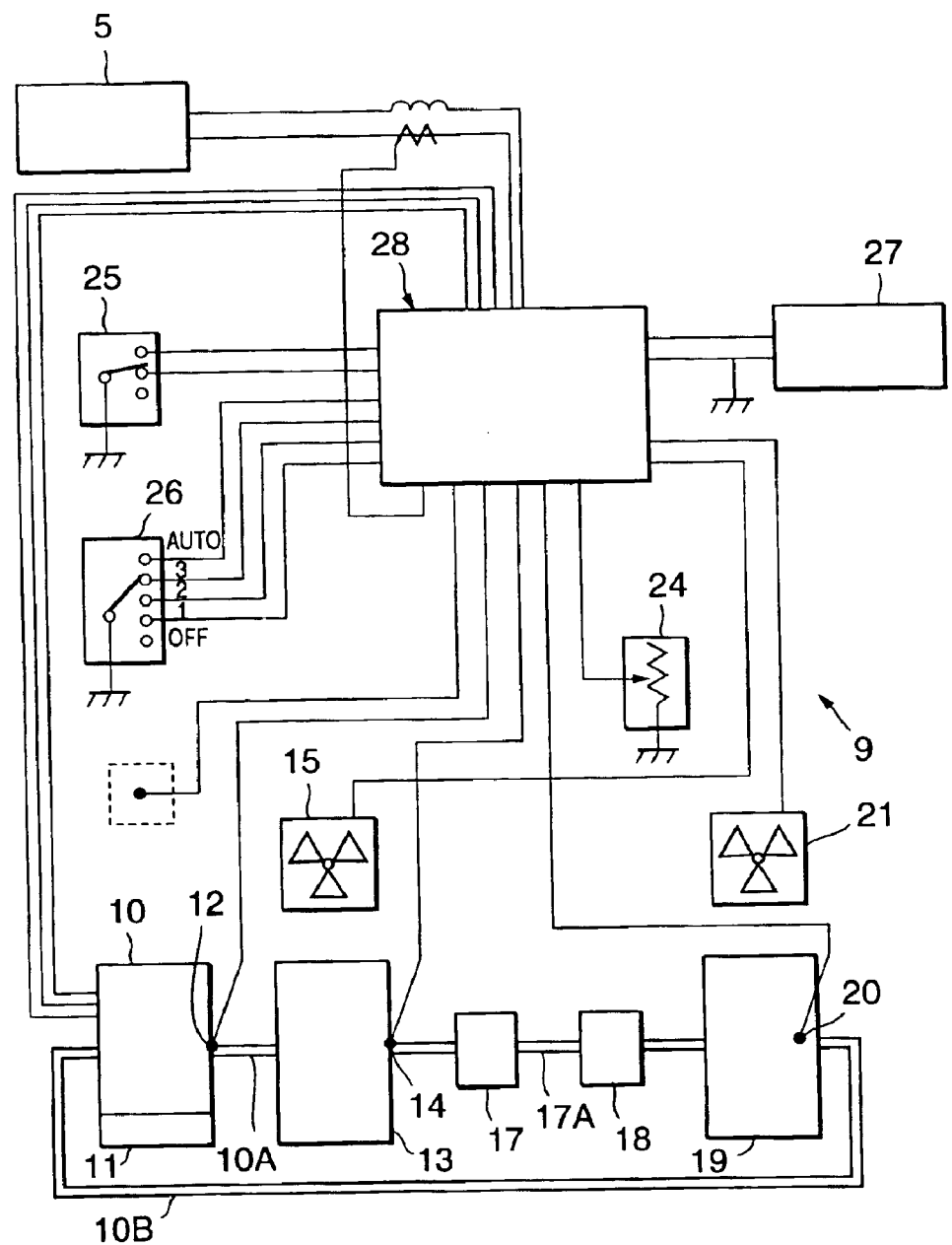
FIG. 3 is a constitutional diagram of an air conditioning unit as air conditioning means in the present invention.
Figure 4:
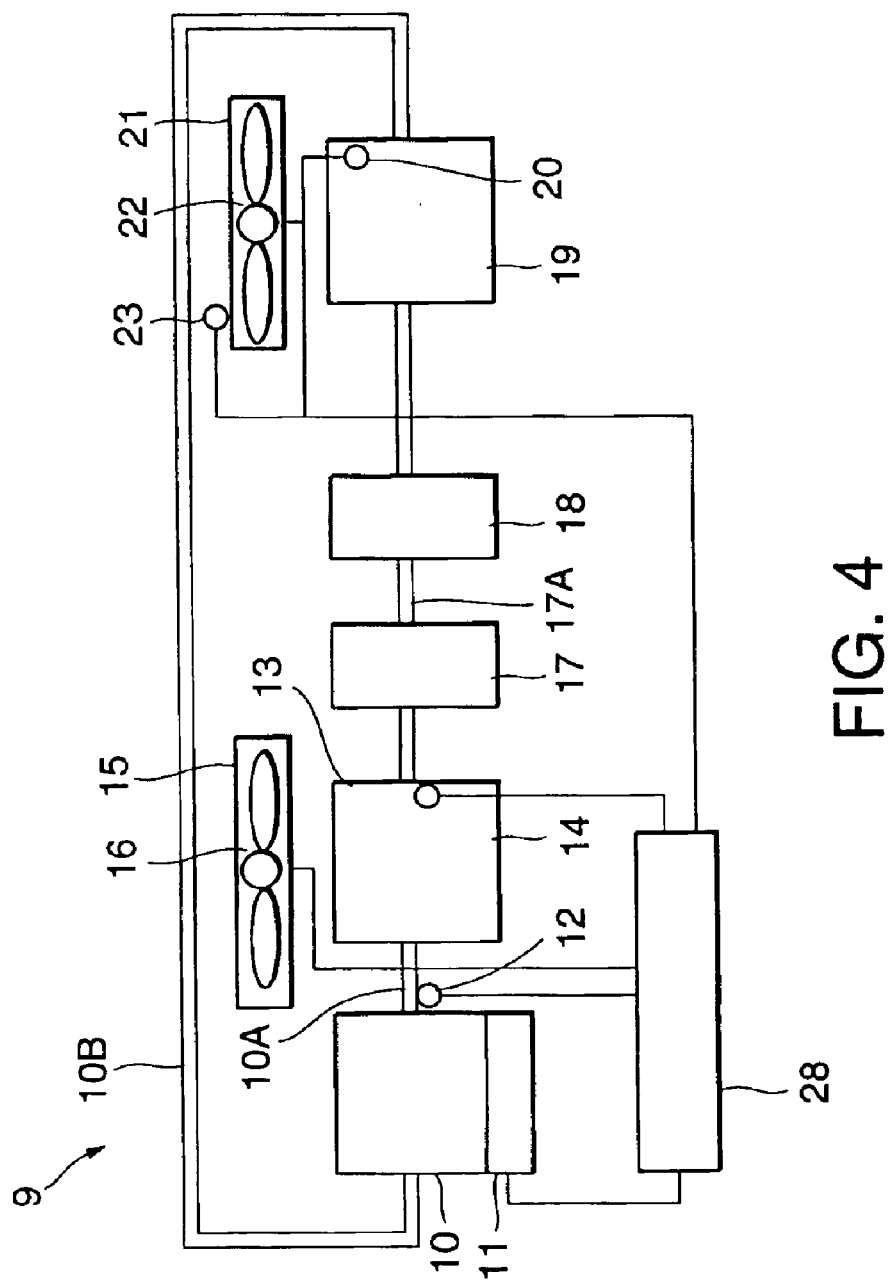
FIG. 4 is a refrigerant circuit diagram of the air conditioning unit shown in FIG. 3.

In respective diagrams, the automobile 1 in the embodiment is a hybrid vehicle (HEV) set forth in the above, and there are mounted an engine (an internal combustion engine) 2 and an air conditioning unit (air conditioning means) 9 including an air-conditioner control unit 28 forming control means on the automobile 1. The air conditioning unit 9 is used for air-conditioning such as cooling, heating, or dehumidifying an inside of a passenger compartment of the automobile 1, wherein a pipe arrangement 10A located in the discharge side of a compressor (an electric compressor) 10 comprising a rotary compressor or the like is connected to a condenser 13 as an exterior unit heat exchanger, while the condenser 13 is connected in the outlet side to a receiver 17. A pipe arrangement 17A located in the outlet side of the receiver 17 is connected to an expansion valve 18 as a decompressor and the expansion valve 18 is connected to an evaporator 19 as an interior unit heat exchanger (a cooler). The evaporator 19 is connected in the outlet side to a pipe arrangement 10B located in the suction side of the compressor 10 so as to form a circular refrigerating cycle (refrigerant circuit) (FIG. 4). In FIG. 1, there is shown a heater at 33, which is used for heating the passenger compartment.

The compressor 10, the condenser 13, and the engine 2 are arranged in the outside of the passenger compartment having no passenger and the evaporator 19 is installed inside the passenger compartment having passengers. The compressor 10 is provided with a compressor motor (electric motor) 11. The compressor motor 11 drives the compressor 10. There is arranged an exterior unit blower 15 for the condenser 13. An exterior unit blower motor 16 rotatively drives the exterior unit blower 15. There is arranged an interior unit blower 21 for the evaporator 19. An interior unit blower motor 22 rotatively drives the interior unit blower 21.

In addition, there are arranged a temperature sensor 12 for detecting a refrigerator discharge temperature in the refrigerant discharge side of the compressor 10, a temperature sensor 14 for detecting a refrigerant outlet temperature in the refrigerant outlet side of the condenser 13, and a temperature sensor 20 for detecting a refrigerant outlet temperature in the refrigerant outlet side of the evaporator 19; they are connected to an air-conditioner control unit 28. The air-conditioner control unit 28 is also connected to a temperature sensor 23 for detecting a temperature of an air that is blown out to the inside of the passenger compartment from the interior unit blower 21. Furthermore, the air-conditioner control unit 28 is also connected to the exterior unit blower motor 16, the interior unit blower motor 22, and a temperature setting volume 24 or an air-conditioner switch 25 arranged on an air-conditioner operation panel inside the passenger compartment.

Note that the air-conditioner control unit 28 steps up or down a voltage (for example, DC240V) of an in-vehicle battery (or a capacitor, both of them forming storage means, BAT) 5 to a desired voltage using a given step-up/step-down circuit and converts the voltage to a driving voltage of the compressor motor 11 using an inverter to rotatively drive the compressor 10.

In addition, the air-conditioner control unit 28 is connected to AUTO rotating in proportion to the number of revolutions of the compressor 10 and to a blower fan switch 26 changing the number of revolutions of the interior unit blower 21 in three steps of 1, 2, and 3 at a fixed ratio and manually determining an amount of air blown into the passenger compartment. A reference character 27 designates a converter that generates a power supply (auxiliary power supply) for operating a headlight, a direction indicator, and a radio (indicated as "other loads" in FIG. 5), which are not shown, the air-conditioner control unit 28, and the like by converting a voltage of the battery 5 to DC12V.

The automobile 1 is provided with an engine (internal combustion engine) 2, a traveling motor (an electric motor M as traveling driving means) 3, and a power generator (generating means G) 4 (these form an HEV motor control system 37); the traveling motor 3 is connected to an in-vehicle battery (DC240V) 5 via a motor control inverter 3A and the power generator 4 is connected to the in-vehicle battery 5 via a power generation inverter (INV) 4A. The engine 2, the traveling motor 3, and the power generator 4 are connected to a torque dividing mechanism, which is not shown, and the torque dividing mechanism drives a gearless drive mechanism 6 described later by integrating revolutions of the traveling motor 3 and the power generator 4 and of the engine 2 and the traveling motor 3. A detailed description is omitted here on the technology of driving the gearless drive mechanism 6 by integrating revolutions of the traveling motor 3 and the power generator 4 and of the engine 2 and the traveling motor 3 using the torque dividing mechanism, since it is a well-known technology.

The traveling motor 3 is mainly used for starting the automobile or for running at a low speed having a low thermal efficiency of the engine 2 and is also used as an assist driving source when requiring a driving force more than one obtained with only the engine 2. Then, as the automobile shifts to high-speed running having a high thermal efficiency of the engine 2, the automobile begins to run mainly with the engine 2. Furthermore, during running mainly with the engine 2, the in-vehicle battery 5 is charged with power generated by the power generator 4 according to a charged condition of the in-vehicle battery 5. In addition, the power generator 4 is used as a starter at starting the engine 2 as well as a power generator during rotation of the engine 2.

The gearless drive mechanism (CVT mechanism; continuously variable transmission) 6 is connected to a wheel 7. Then, the engine 2 or the traveling motor 3 rotates the wheel 7 via the gearless drive mechanism 6 to move the automobile 1. A detailed description is omitted here on the technology of rotating the wheel 7 via the gearless drive mechanism 6 driven by the engine 2 or the traveling motor 3 to move the automobile 1 since it is a conventionally known technology.

Figure 5:
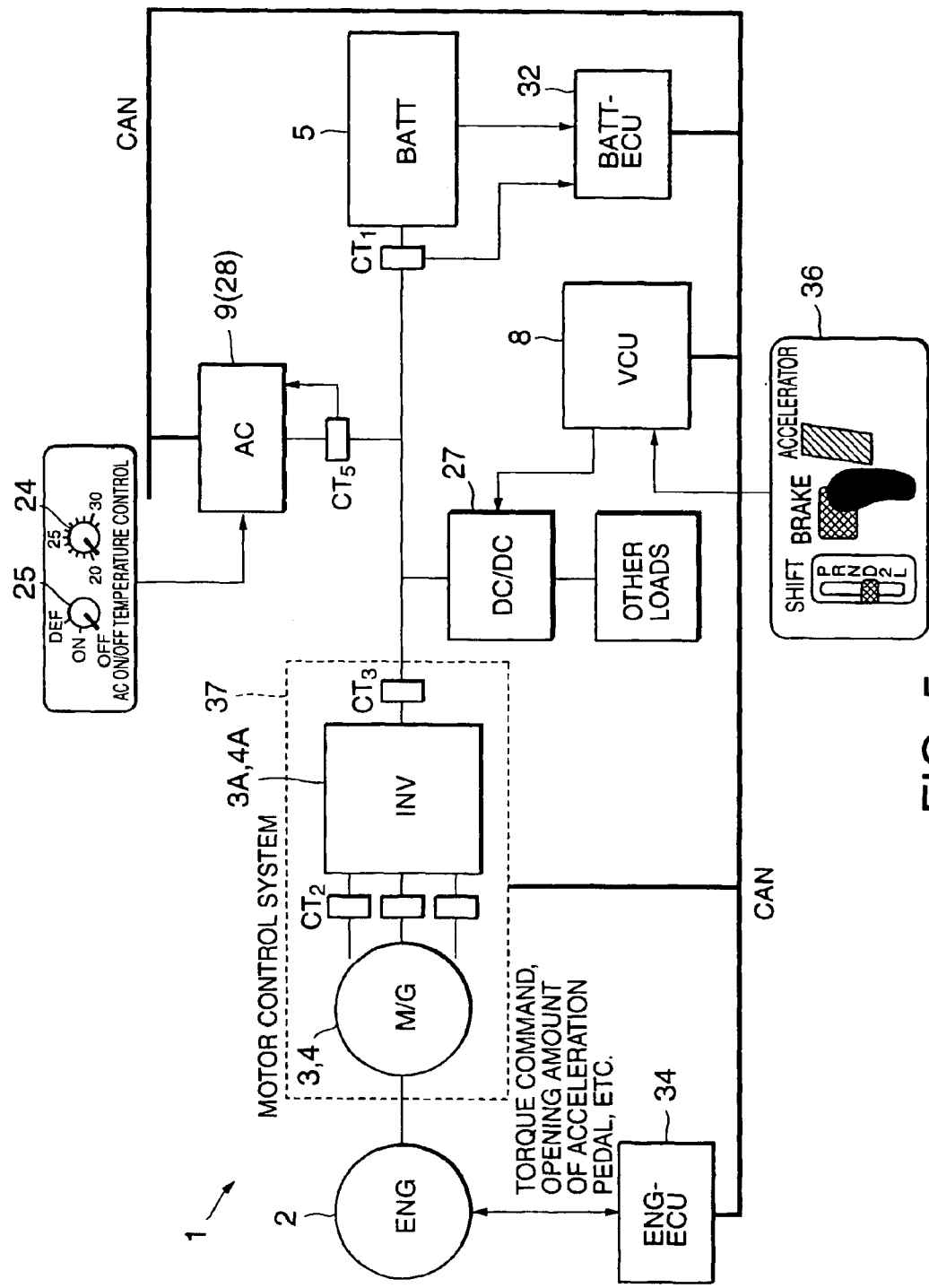
FIG. 5 is a block diagram of a control system of an automobile in which the automotive air conditioning system of the present invention is applied to a hybrid vehicle.

A reference character 8 in FIG. 5 designates a main control unit (VCU) of the automobile 1 forming control means, which steps up or down the voltage (DC240V) of the in-vehicle battery 5 to a given voltage using the same step-up/step-down circuit as mentioned above, converts the voltage to a driving voltage of the traveling motor 3 using the inverter (the motor control inverter 3A), and rotates the traveling motor 3.

Furthermore, the air-conditioner control unit 28 generates a driving signal of the compressor 10. Then, the air-conditioner control unit 28 detects a position of a rotor of the compressor motor 11 from an induced voltage of the compressor motor 11 and controls an operation frequency (the number of revolutions) of the compressor motor 11 using the inverter generating the next excitation pattern with a microcomputer. In FIG. 5, reference characters 32 and 34 designate a battery control unit (BATTECU) for controlling power of the in-vehicle battery 5 and an engine control unit (ENGECU) for transmitting a torque command, an opening amount of an acceleration pedal, and the like to the engine 2 so as to control its operation, respectively. In addition, a reference character 36 designates a driving control section including an acceleration pedal, a brake pedal, and a shift lever of the automobile 1, and a sensor for detecting their control amounts or control states is connected to the main control unit 8.

A basic passenger compartment air conditioning operation of the air conditioning unit 9 will be described here. The compressor motor 11 and the exterior unit blower motor 16 are powered by the in-vehicle battery 5. After the air conditioning unit 9 is activated, the air-conditioner control unit 28 controls the operation frequency of the compressor motor 11 to control a performance of the compressor 10. A high-temperature and high-pressure gas refrigerant, which has been compressed by the compressor 10 and then discharged, flows into the condenser 13 from the pipe arrangement 10A. At this point, the condenser 13 is cooled outside the passenger compartment by the wind from the exterior unit blower 15 (indicated by an outline arrow in FIG. 1). The gas refrigerant that has flown into the condenser 13 is condensed to a liquid with a heat release there and then flows into the receiver 17. Subsequently, the liquid refrigerant once stored in the receiver 17 reaches the expansion valve 18 through the pipe arrangement 17A and is wrung there, before flowing into the evaporator 19.

The refrigerant that has flown into the evaporator 19 evaporates there and absorbs heat from the circumambient air at that time to make its cooling action, and the cooled air in the passenger compartment is circulated in the passenger compartment by the interior unit blower 21 for cooling and air conditioning (indicated by the outline arrow in FIG. 1). The refrigerant having getting out of the evaporator 19 enters the accumulator (not shown) and non-evaporating liquid refrigerant is separated into vapor and liquid there, and thereafter only a gas refrigerant is sucked into the compressor 10, where a refrigerating cycle is repeated such that the gas refrigerant is compressed by the compressor 10 and discharged again.

Subsequently, the following formulas express relationships between a temperature of an air blown into the passenger compartment (a temperature detected by the temperature sensor 23 for detecting a temperature of an air blown into the passenger compartment by the interior unit blower 21), an operation frequency of the compressor motor 11, and the number of revolutions of the interior unit blower motor 22. In the formulas, a targeted operation frequency (F) is determined with PI (proportion and integration) operations based on a deviation ($\Delta e$) of a deviation (e) of "an air plenum temperature from a preset temperature of the evaporator 19" from the previous deviation (em).

$$\Delta e = e - em \quad (1)$$

In the formula (1), e=(the preset temperature=the temperature set with the temperature setting volume 24)−(the air plenum temperature=the temperature detected by the temperature sensor 23), where an initial value of em is 0.

$$\Delta F = Kp \times \Delta e + Ki \times e \quad (2)$$

In the formula (2), $\Delta F$=a targeted operation frequency variation calculated value, Kp=a proportionality constant, and Ki=an integral constant.

$$F = \Delta F + Fm \quad (3)$$

In the formula (3), Fm=the previous targeted operation frequency.

The targeted operation frequency calculated from the above formulas are applied to the following formula to perform a PWM control on an applied voltage (applied voltage adjustment) of the interior unit blower motor 22 for an airflow adjustment of the interior unit blower 21.

$$\text{PWM duty} = (\text{Max. duty} - \text{Min. duty})/(\text{Max. frequency} - \text{Min. frequency}) \times (\text{Targeted frequency} - \text{Min. frequency}) + \text{Min. duty} \quad (4)$$

In the formula (4), Max. duty=the maximum duty for the PWM control of the interior unit blower, Min. duty=the minimum duty for the PWM control of the interior unit blower, Max. frequency=the maximum value of the targeted operation frequency, and Min. frequency=the minimum value of the target operation frequency.

In other words, the air-conditioner control unit 28 determines the operation frequency of the compressor motor 11 on the basis of a temperature of the air blown into the passenger compartment by the interior unit blower 21. Then, it controls the number of revolutions of the interior unit blower motor 22 on the basis of the determined operation frequency of the compressor motor 11. In other words, if the air temperature in the passenger compartment is a little higher than the preset temperature set with the temperature setting volume 24, the control unit slightly increases the operation frequency of the compressor motor 11 and the number of revolutions of the interior unit blower motor 22 (which results in a little increase in the power consumption of the air conditioning unit 9 including the compressor motor 11.) This prevents an extreme increase in the rotation noise of the compressor motor 11 and the interior unit blower motor 22, but holds it down with just a minor increase of the noise.

If the air temperature in the passenger compartment is much higher than the preset temperature set with the temperature setting volume 24, the control unit increases the operation frequency of the compressor motor 11 and the number of revolutions of the interior unit blower motor 22 for rapid air conditioning in the passenger compartment, thereby enabling a comfortable passenger compartment air conditioning (which results in a remarkable increase in the power consumption of the air conditioning unit 9 including the compressor motor 11.) Particularly, if there is no significant deviation of the air temperature in the passenger compartment from the preset temperature set with the temperature setting volume 24, it becomes possible to perform a comfortable passenger compartment air conditioning by the performance control with the operation frequency control of the compressor motor 11 and a slight airflow control of the interior unit blower 21 determined on the basis thereof.

In this manner, the air-conditioner control unit 28 controls the operation frequency of the compressor motor 11 with an inverter on the basis of the deviation of the air plenum temperature of the evaporator 19 from the preset temperature. Therefore, it becomes possible to perform a control such that, as the temperature deviation becomes larger, the revolutions of the compressor motor 11 increases correspondingly (large power consumption), while, as the temperature deviation becomes negligible, the revolutions of the compressor motor 11 decreases to zero (small power consumption). In this case, the interior unit blower motor 22 is also controlled in the same manner as for the compressor motor 11, by which an airflow can be adapted to the temperature difference felt by a passenger in the passenger compartment, so that the comfortable air conditioning is achieved in the passenger compartment.

In addition, the in-vehicle battery 5 feeds the compressor motor 11 with power, by which the number of revolutions of the compressor motor 11 can be easily controlled. This enables the control of the number of revolutions of the compressor motor 11. Accordingly, the compressor 10 can be preferably driven, thereby enabling comfortable air conditioning in the passenger compartment.

The following describes a power control related to the air conditioning unit 9 of the automobile 1 in the present invention referring to FIG. 5. In FIG. 5, CT1 designates a current transformer for detecting a charging current value to the in-vehicle battery 5 and a discharging current value from the in-vehicle battery 5 and the charging current value or the discharging current value detected by the current transformer CT1 is input to the battery control unit 32. CT2 designates a current transformer for detecting a power generation current value of the power generator 4 and the power generation current value detected by the current transformer CT2 is input to the motor control system 37.

CT3 designates a current transformer for detecting a power generation current value that has passed through the power generation inverter 4A, and the power generation current value detected by the current transformer CT3 is also input to the motor control system 37. CT5 designates a current transformer for detecting a transport current value (a current consumption value) of the air conditioning unit 9 including the compressor motor 11, and the transport current value detected by the current transformer CT5 is input to the air-conditioner control unit 28. The main control unit 8, the motor control system 37, the engine control unit 34, the battery control unit 32, and the air-conditioner control unit 28 are connected to a network (hereinafter, referred to as CAN) in the automobile 1, and data is transmitted or received to or from each other via the CAN. Data of the detected current values (the discharging current, the charging current, and the power generation current) of the respective current transformers is transmitted from the motor control system 37, the respective control units 32 and 28 to the CAN, by which the data can be used between devices connected to the CAN.

The motor control system 37 calculates the margin power generation ΔG1 that the power generator 4 can further output (the maximum permissible power that can be supplied by the power generator 4—the currently-output generation power) on the basis of the current power generation current values of the power generator 4 detected by the current transformers CT2 and CT3 or the number of revolutions of the engine 2. Then, it transmits data of the margin power generation ΔG1 to the CAN. The engine control unit 34 calculates a margin horsepower ΔH that the engine 2 can further output by subtracting the currently output torque from the maximum torque curve of the engine 2. Then, it transmits data of the margin horsepower ΔH to the CAN.

The battery control unit 32 estimates an amount of storage of the in-vehicle battery 5 from the integrated value of the discharging current detected by the current transformer CT1 and a voltage of the in-vehicle battery 5 and calculates a permissible discharging current increment ΔE, which is an increment of the discharging current permissible in the in-vehicle battery 5 (a limit discharging amount—the current discharging amount of the battery 5), from the discharging current value detected by the current transformer CT1 and the amount of storage of the in-vehicle battery 5. Thereafter, it transmits data of the permissible discharging current amount ΔE to the CAN.

The main control unit 8 compares the margin power generation ΔG1 with the margin horsepower ΔH transmitted to the CAN in this manner and considers a lower value to be a permissible power generation increment ΔG, which is an increment of the power generation permissible in the power generator 4. Then, it transmits data of the permissible power generation increment ΔG to the CAN. In addition, the main control unit 8 calculates an electric energy of the permissible power generation increment ΔG added to the permissible discharging current increment ΔE (ΔG+ΔE) and transmits the data to the CAN. Furthermore, the main control unit 8 adds the permissible discharging current increment ΔE to the permissible power generation increment ΔG and then calculates a margin-power utilization ratio α fluctuating within the range of 0 to 1 in proportion to a value obtained by subtracting the margin horsepower ΔH from the sum in the above. The margin-power utilization ratio α gets lower (approximates 0) if a ratio of the margin horsepower ΔH is high relative to the sum of the margin power generation increment ΔG and the margin discharging current increment ΔE, while it gets higher (approximates 1) if the ratio of the margin horsepower ΔH is low. Then, data of the margin-power utilization ratio α is also transmitted to the CAN.

Still further, the main control unit 8 calculates a permissible power consumption increment ΔU, which is an amount of power consumption that can be further increased in the air conditioning unit 9 by multiplying the sum of the permissible power generation increment ΔG and the permissible discharging current increment ΔE by the margin-power utilization ratio α. In this condition, if a ratio of the margin horsepower ΔH is high relative to the sum of the permissible power generation increment ΔG and the permissible discharging current increment ΔE and the margin-power utilization ratio α is low, the permissible power consumption increment ΔU gets lower; on the other hand, if the ratio of the margin horsepower ΔH is low and the margin-power utilization ratio α is high, the permissible power consumption increment ΔU gets higher. For example, if the margin horsepower ΔH is 0 and the margin-power utilization ratio α is 1, the sum of the permissible power generation increment ΔG and the permissible discharging current increment ΔE equals the permissible power consumption increment ΔU. Then, the main control unit 8 also transmits data of the permissible power consumption increment ΔU to the CAN.

The air-conditioner control unit 28 receives respective data of the margin power generation ΔG, the margin horsepower ΔH, the permissible power generation increment ΔG, the permissible discharging current increment ΔE, the margin-power utilization ratio α, and the permissible power consumption increment ΔU transmitted to the CAN and utilizes them for controls as described later. Note that the permissible power consumption increment ΔU becomes an increment of the power consumption of the air conditioning unit 9 concerned permitted if the power consumption increases in the air conditioning unit 9 when the air-conditioner control unit 28 of the air conditioning unit 9 performs the basic passenger compartment air conditioning operation as mentioned above.

Figure 6:
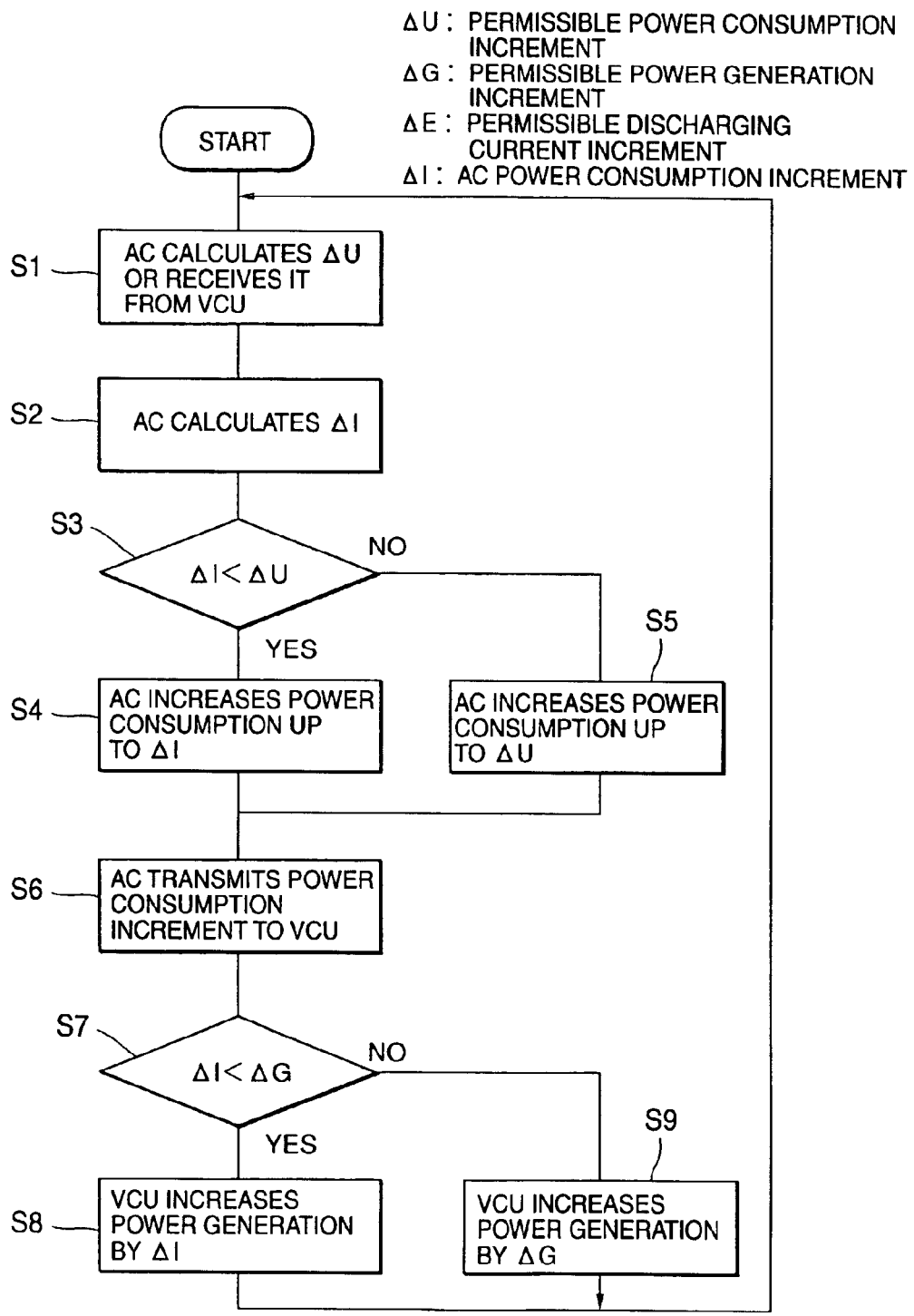
FIG. 6 is a flowchart of a power control of the automotive air conditioning system of the present invention.

In the arrangement described hereinabove, power controls related to the air conditioning unit 9 in the automobile 1 will now be described, referring to a flowchart in FIG. 6. The air-conditioner control unit 28 of the air conditioning unit 9 compares the margin power generation ΔG1 with the margin horsepower ΔH transmitted to the CAN and considers a lower value to be the permissible power generation increment ΔG, as mentioned above, in step S1 shown in FIG. 6. Subsequently, it calculates an electric energy (ΔG+ΔE) by adding the permissible power generation increment ΔG to the permissible discharging current increment ΔE. Next, the air conditioning unit 28 calculates the permissible power consumption increment ΔU by multiplying the electric energy (ΔG+ΔE) by the margin-power utilization ratio α. Otherwise, it receives the above permissible power consumption increment ΔU calculated in the main control unit 8 as described above.

Next, in step S2, the air-conditioner control unit 28 calculates a power consumption increment ΔI of the air conditioning unit 9 required in future (almost all is an increment of the power consumption of the compressor motor 11) in performing the basic passenger compartment air conditioning operation as described above.

Subsequently, the air-conditioner control unit 28 determined whether the power consumption increment ΔI is lower than the permissible power consumption increment ΔU in step S3; if so, it controls the compressor motor 11 or the like increasing the power consumption up to ΔI in step S4. On the other hand, if the power consumption increment ΔI is equal to or higher than the permissible power consumption increment ΔU in the step S3, the control progresses to step S5 to execute a control of increasing the power consumption up to the permissible power consumption increment ΔU independently of the basic passenger compartment air conditioning operation mentioned above. The control in this condition includes restricting the rise of the operation frequency of the compressor motor 11 or each blower motor.

Next, the air-conditioner control unit 28 transmits the power consumption increment ΔI to the main control unit 8 in step S6. The main control unit 8 determines whether the received power consumption increment ΔI is lower than the permissible power generation increment ΔG in step S7; if so, the control progresses to step S8, where the main control unit 8 transmits control data to the engine control unit 34 and then the engine control unit 34 controls the engine 2 to increase the power generation of the power generator 4 by just ΔI. On the other hand, if the power consumption increment ΔI is higher than the permissible power generation increment ΔG in the step S7, the control progresses to step S9, where the main control unit 8 increases the power generation of the power generator 4 by just ΔG.

With this execution of the controls, an increase of the power consumption of the air conditioning unit 9 is limited within the range of at least the permissible power consumption increment ΔU (it equals an electric energy of the permissible power generation increment ΔG of the power generator 4 added to the permissible discharging current increment ΔE of the in-vehicle battery 5 if the margin-power utilization ratio α is 1). Therefore, it prevents the disadvantage of the traveling malfunction or disabled traveling of the traveling motor 3 which may be caused by a decrease of a storage amount or discharging to the fullest of the in-vehicle battery 5 due to power consumption of the air conditioning unit 9 including the compressor motor 11. In addition, the power generation of the power generator 4 increases within the range of the permissible power generation increment ΔG according to the power consumption increment ΔI of the air conditioning unit 9 and therefore the air conditioning capability of the air conditioning unit 9 can be secured as much as possible, by which the air conditioning performance in the passenger compartment can be prevented or minimized. Particularly, the permissible discharging current increment ΔE of the in-vehicle battery 5 is also considered in the increase of the power consumption of the air conditioning unit 9 in this condition. Therefore, under such circumstances that traveling loads of the automobile 1 are reduced such as, for example, during parking or on the downgrade, the air conditioning capability of the air conditioning unit 9 can be maximized by discharging the in-vehicle battery 5 within the allowable range, by which more comfortable air conditioning can be achieved in the passenger compartment.

Figure 7:
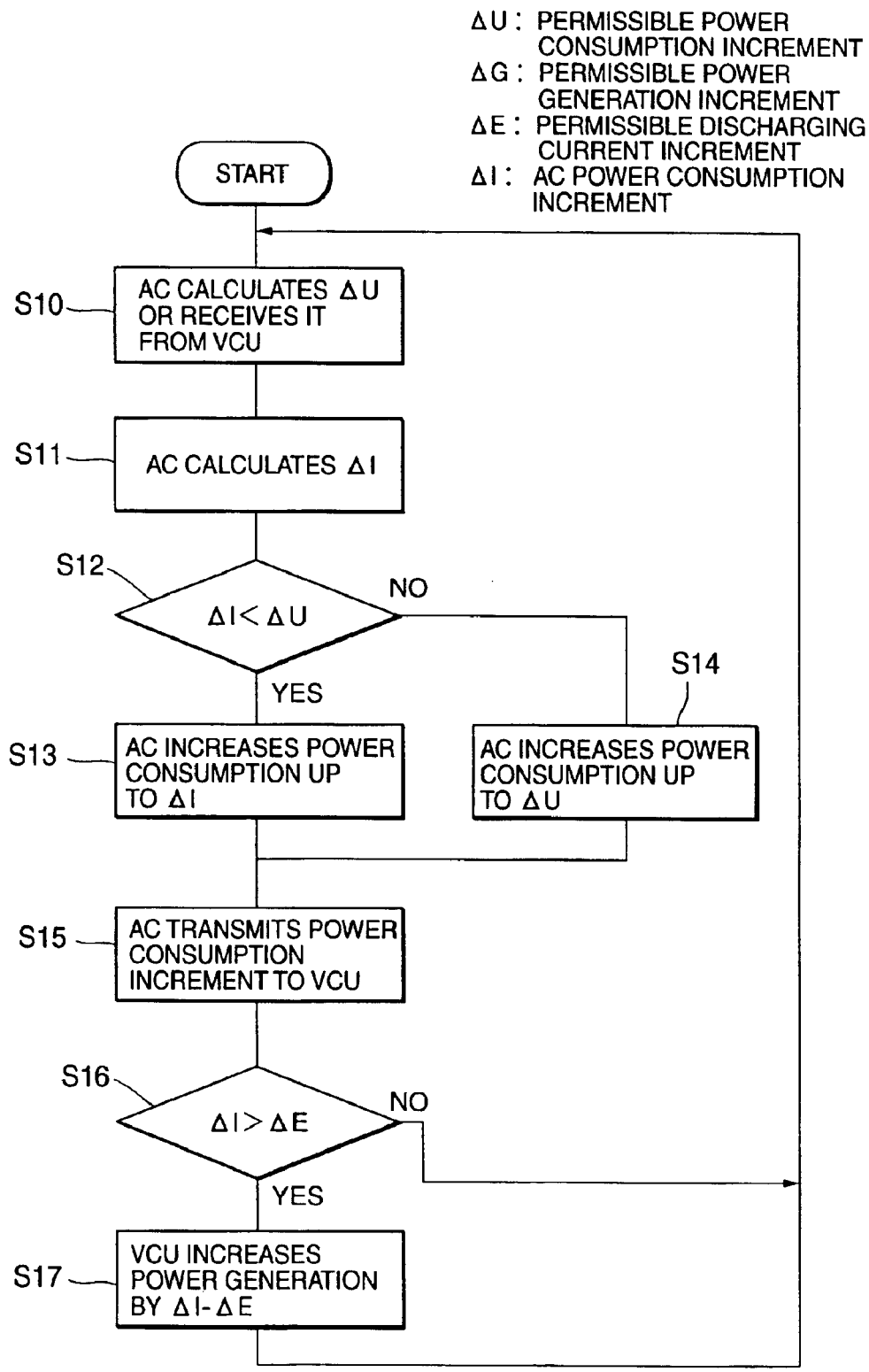
FIG. 7 is a flowchart of another power control of the automotive air conditioning system of the present invention.

The following describes other power controls related to the air conditioning unit 9 according to the present invention by using a flowchart shown in FIG. 7. In this case, the air-conditioner control unit 28 of the air conditioning unit 9 also compares the margin power generation ΔG1 with the margin horsepower ΔH transmitted to the CAN as described above and considers a lower value to be the permissible power generation increment ΔG in step S10 shown in FIG. 7. Then, it calculates an electric energy (ΔG+ΔE) by adding the permissible power generation increment ΔG to the permissible discharging current increment ΔE. Next, the air conditioning unit 28 calculates the permissible power consumption increment ΔU by multiplying the electric energy (ΔG+ΔE) by the margin-power utilization ratio α. Otherwise, it receives the above permissible power consumption increment ΔU calculated in the main control unit 8 as described above.

Next, in step S11, the air-conditioner control unit 28 calculates a power consumption increment ΔI of the air conditioning unit 9 required in future (almost all is an increment of the power consumption of the compressor motor 11) in performing the basic passenger compartment air conditioning operation as described above.

Subsequently, the air-conditioner control unit 28 determined whether the power consumption increment ΔI is lower than the permissible power consumption increment ΔU in step S12; if so, it controls the compressor motor 11 or the like for increasing the power consumption up to ΔI in step S13. On the other hand, if the power consumption increment ΔI is equal to or higher than the permissible power consumption increment ΔU in the step S12, the control progresses to step S14 to execute a control of increasing the power consumption up to the permissible power consumption increment ΔU independently of the basic passenger compartment air conditioning operation mentioned above. The control in this condition includes restricting the rise of the operation frequency of the compressor motor 11 or each blower motor.

Next, the air-conditioner control unit 28 transmits the power consumption increment ΔI to the main control unit 8 in step S15. The main control unit 8 determines whether the received power consumption increment ΔI is higher than the permissible discharging current increment ΔE in step S16; if it is equal to or lower than the permissible discharging current increment ΔE, the control returns to step S10. If it is higher, the control progresses to step S17, where the main control unit 8 transmits data to the engine control unit 34 and then the engine control unit 34 controls the engine 2 to increase the power generation of the power generator 4 by just (ΔI−ΔE). In addition, if (ΔI−ΔE) exceeds ΔG, the main control unit 8 naturally increases the power generation up to ΔG in the same manner as in the above steps S7 to S9.

With this control, an increase of the power consumption of the air conditioning unit 9 is limited within the range of at least the permissible power consumption increment ΔU (it equals an electric energy of the permissible power generation increment ΔG of the power generator 4 added to the permissible discharging current increment ΔE of the in-vehicle battery 5 if the margin-power utilization ratio α is 1). Therefore, it prevents the disadvantage of the traveling malfunction or disabled traveling of the traveling motor 3 which may be caused by a decrease of a storage amount or discharging to the fullest of the in-vehicle battery 5 due to power consumption of the air conditioning unit 9.

In addition, the power generation of the power generator 4 is increased by an excess of the power consumption increment of the air conditioning unit 9 over the permissible discharging current increment ΔE, and therefore the air conditioning capability of the air conditioning unit 9 can be secured as much as possible, by which the air conditioning performance in the passenger compartment can be prevented or minimized. Particularly, the permissible discharging current increment ΔE of the in-vehicle battery 5 is also considered in the increase of the power consumption of the air conditioning unit 9 in this condition. Therefore, under such circumstances that traveling loads of the automobile 1 are reduced, the air conditioning capability of the air conditioning unit 9 can be maximized by discharging the in-vehicle battery 5 within the allowable range in the same manner, by which more comfortable air conditioning can be achieved in the passenger compartment. Furthermore, the increase of the power generation is limited to an excess of the power consumption increment of the air conditioning unit 9 over the permissible discharging current increment, thereby minimizing an increase of the consumption energy for increasing the power generation in the power generator 4.

Figure 8:
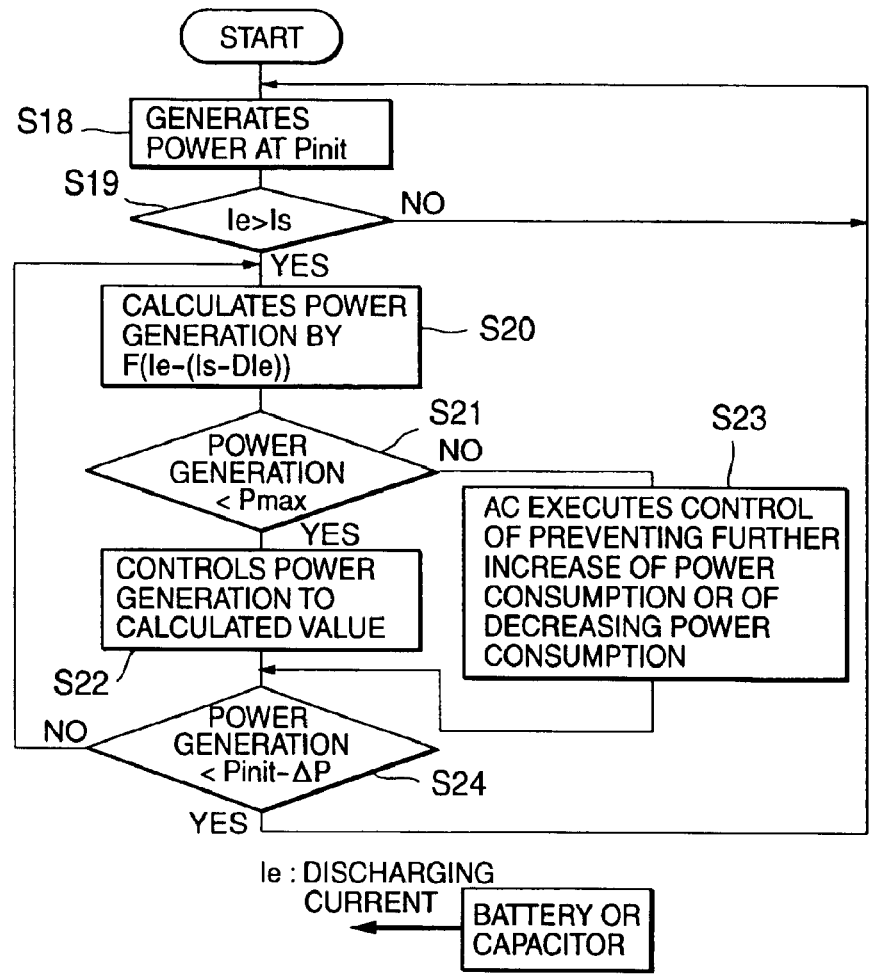
FIG. 8 is a flowchart of still another power control of the automotive air conditioning system of the present invention.
Figure 9:
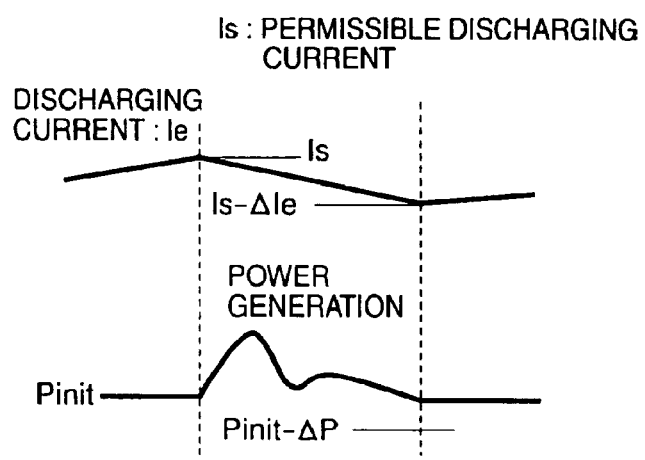
FIG. 9 is a diagram of assistance in explaining a transition of a discharging current value and a variation of power generation in FIG. 8.

The following describes another power control related to the air conditioning unit 9 according to the present invention by using FIG. 8 and FIG. 9. In this case, the main control unit 8 controls the engine 2 so that the initial power generation of the power generator 4 is equal to an initial value Pinit in step S18 of a flowchart shown in FIG. 8 using the engine control unit 34. Next, the main control unit 8 determines whether a discharging current value Ie from the in-vehicle battery 5 exceeds a given permissible value Is on the basis of the data transmitted to the CAN as described above In step S19; if not, the control returns to the step S18. If the discharging current value Ie exceeds the permissible value Is as shown in the upper part of FIG. 9, the main control unit 8 progresses to step S20 from the step S19 to calculate such an amount of power generation of the power generator 4 that the discharging current value Ie from the in-vehicle battery 5 is equal to a given return value (Is−ΔIe) lower than the permissible value Is in accordance with a PI feedback operation of formula F(Ie−(Is−ΔIe)).

Next the main control unit 8 determines whether the power generation calculated in step S21 is lower than the upper limit of the power that the power generator 4 can generate (the above maximum permissible power) Pmax; if so, the main control unit 8 progresses to step S22 to control the power generation of the power generator 4 to the value calculated in the step S20 and then progresses to step S24. On the other hand, if the power generation calculated in the step S21 is equal to or higher than the upper limit Pmax of the power generation of the power generator 4, the main control unit 8 progresses to step S23 from the step S21 to notify the air-conditioner control unit 28 of the air conditioning unit 9 that the power generation of the power generator 4 has reached the upper limit Pmax and then progresses to step S24. In response to it, the air-conditioner control unit 28 executes a control of preventing the power consumption to increase further or of controlling the compressor motor 11 for reducing the power consumption in the same manner as for the above, independently of the above basic passenger compartment air conditioning operation. In addition to these, the main control unit 8 can reduce the power consumption of other electrical loads of the automobile 1. In this case, the electrical loads of the automobile 1 can be prioritized in advance so as to stop or reduce feeding of the loads in the order of ascending priorities from the lowest priority load (for example, a load that does not cause any trouble in traveling itself of the automobile 1 such as, for example, audio equipment or interior light).

If the discharging current value Ie from the in-vehicle battery 5 gradually decreases as shown in the upper part of FIG. 9 with the above control, the power generation of the power generator 4 also shifts from the initial rise to the decline in time as shown in the lower part of FIG. 9. If the power generation of the power generator 4 is equal to or higher than the initial value Pinit, however, the control returns to the step S20 to repeat the above. Then, if the power generation finally gets lower than the initial value (Pinit−ΔP) (ΔP: hysteresis), the main control unit 8 returns to the step S18 from the step S24 to return to the initial control with the initial value Pinit as the power generation of the power generator 4.

This effectively eliminates the disadvantage of the traveling malfunction or disabled traveling of the traveling motor 3 which may be caused by a decrease of a storage amount or discharging to the fullest of the in-vehicle battery 5 due to power consumption of the air conditioning unit 9. Particularly, the in-vehicle battery 5 is to be discharged up to the permissible value Is, and therefore under such circumstances that traveling loads are reduced, it becomes possible to discharge the in-vehicle battery 5 within the allowable range so as to maximize the air conditioning capability of the air conditioning unit 9, thereby achieving more comfortable air conditioning in the passenger compartment.

In addition, the main control unit 8 controls the power generation of the power generator 4 so that the discharging current value Ie drops to a return value (Is−ΔIe) lower than the permissible value Is, while it brings the power generation of the power generator 4 back to the initial value Pinit if the power generation concerned drops to a value lower than the initial value Pinit, thereby eliminating the disadvantage of a decrease of a storage amount or discharging to the fullest of the in-vehicle battery 5 while the power generation of the power generator 4 is well controlled without trouble.

Furthermore, if the power generation of the power generator 4 reaches the upper limit Pmax, the air-conditioner control unit 28 executes controls of stopping the increase of the power consumption in the air conditioning unit 9 or of decreasing the power consumption concerned, thereby enabling the air conditioning capability of the air conditioning unit 9 to be secured as much as possible while it becomes possible to prevent the disadvantage reliably of the traveling malfunction or disabled traveling which may be caused by a decrease of a storage amount or discharging to the fullest of the in-vehicle battery 5 due to power consumption of the air conditioning unit 9.

Figure 10:
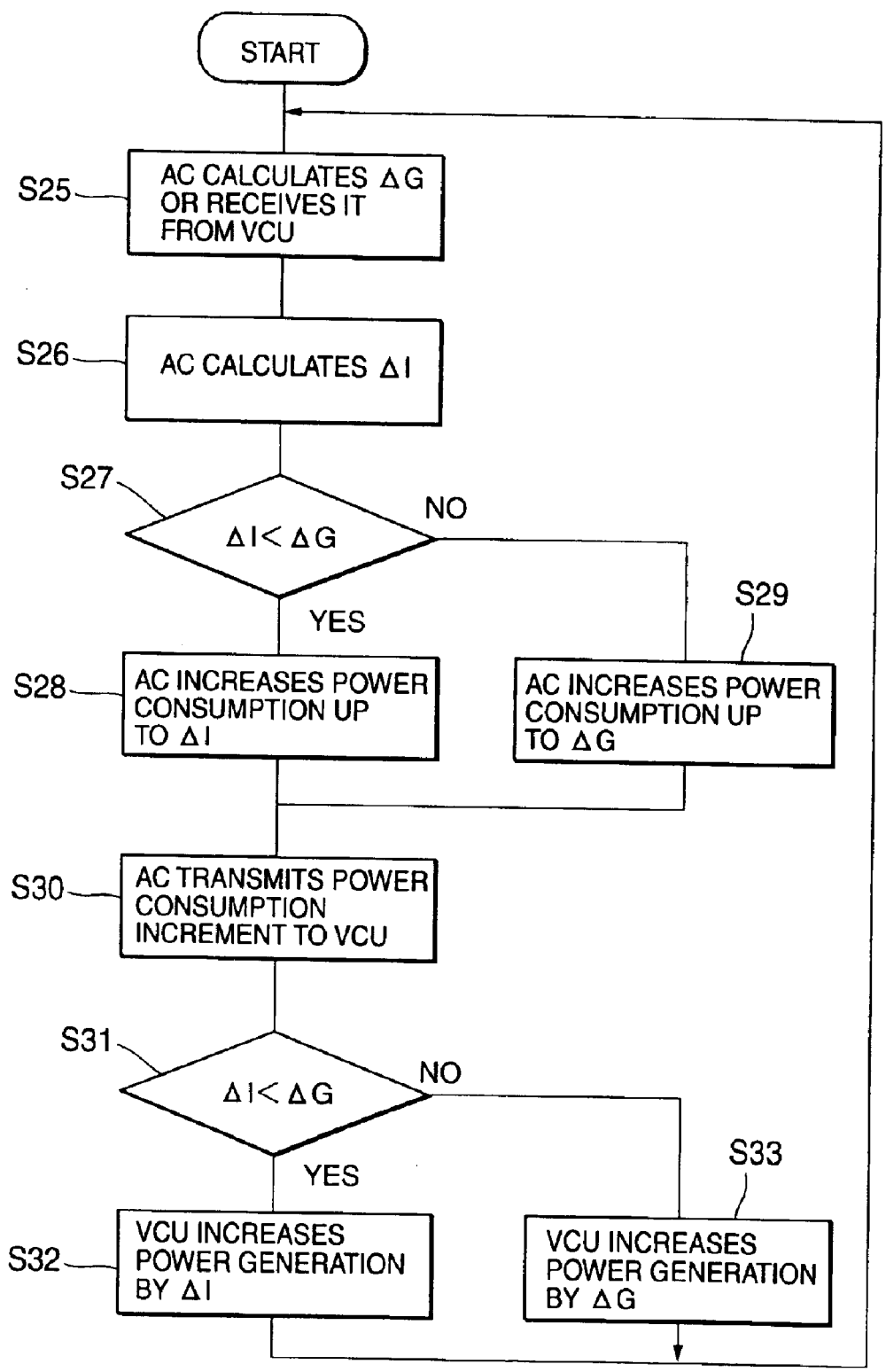
FIG. 10 is a flowchart of further another power control of the automotive air conditioning system of the present invention.

The following describes still another power control related to the air conditioning unit 9 according to the present invention by using a flowchart shown in FIG. 10. In this case, the air-conditioner control unit 28 of the air conditioning unit 9 compares the margin power generation ΔG1 with the margin horsepower ΔH transmitted to the CAN as set forth in the above and considers a lower value to be the permissible power generation increment ΔG in step S25 shown in FIG. 10. Otherwise, the main control unit 8 receives the permissible power generation increment ΔG calculated as set forth in the above. Next, in step S26, the air-conditioner control unit 28 calculates the power consumption increment ΔI of the air conditioning unit 9 required in future in performing the basic passenger compartment air conditioning operation as described above.

Subsequently, the air-conditioner control unit 28 determined whether the power consumption increment ΔI is lower than the permissible power generation increment ΔG in step S27; if so, it controls the compressor motor 11 or the like for increasing the power consumption up to ΔI in step S28. On the other hand, if the power consumption increment ΔI is equal to or higher than the permissible power generation increment ΔG in the step S27, the control progresses to step S29 to execute a control of the compressor motor 11 for increasing the power consumption up to the permissible power generation increment ΔG independently of the basic passenger compartment air conditioning operation mentioned above.

Next, the air-conditioner control unit 28 transmits the power consumption increment ΔI to the main control unit 8 in step S30. The main control unit 8 determines whether the received power consumption increment ΔI is lower than the permissible power generation increment ΔG in step S31; if so, the control progresses to step S32, where the engine control unit 34 controls the engine 2 to increase the power generation of the power generator 4 by just ΔI. On the other hand, if the power consumption increment ΔI is equal to or higher than the permissible power generation increment ΔG in the step S31, the control progresses to step S33, where the main control unit 8 increases the power generation of the power generator 4 by just ΔG.

With this control, an increase of the power consumption of the air conditioning unit 9 is limited within the range of at least the permissible power generation increment ΔG (a lower value of the margin power generation ΔG1 of the power generator 4 and the margin horsepower ΔH of the engine 2). This prevents the disadvantage of the traveling malfunction or disabled traveling of the traveling motor 3 which may be caused by a decrease of a storage amount or discharging to the fullest of the in-vehicle battery 5 due to power consumption of the air conditioning unit 9. In addition, the power generation of the power generator 4 is increased according to the power consumption increment of the air conditioning unit 9, and therefore the air conditioning capability of the air conditioning unit 9 can be secured as much as possible, by which the air conditioning performance in the passenger compartment can be prevented or minimized.

Figure 11:
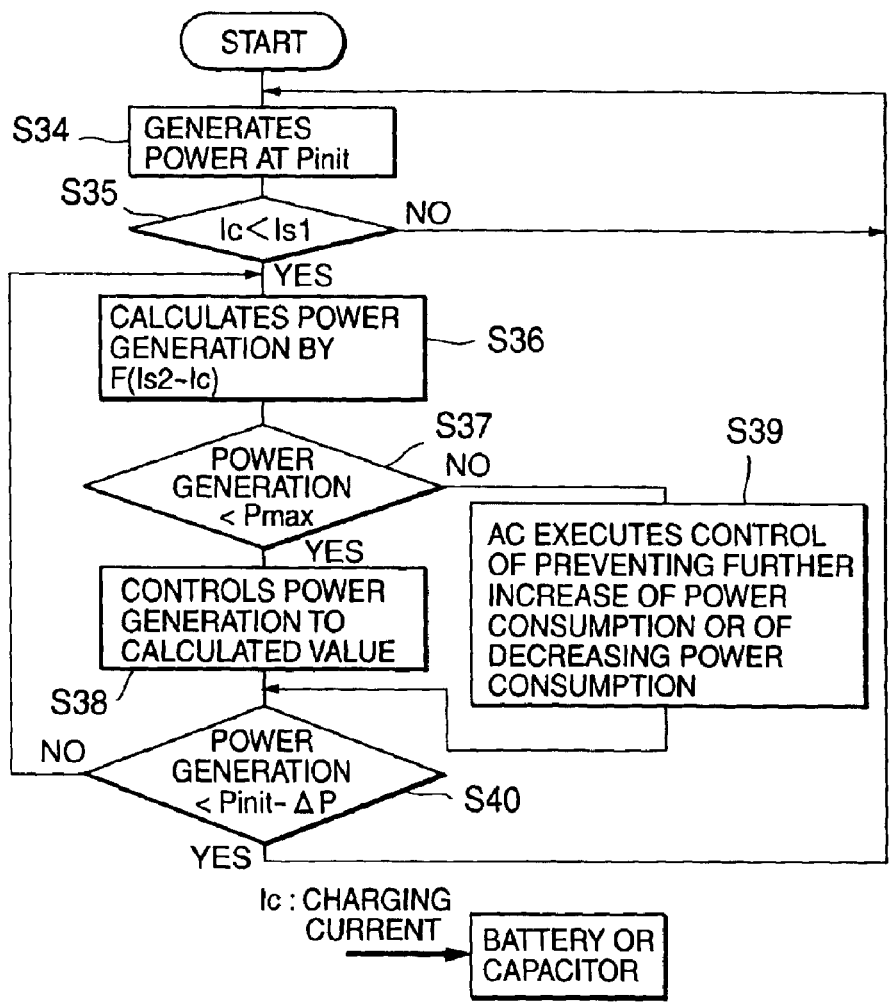
FIG. 11 is a flowchart of another power control of the automotive air conditioning system of the present invention.
Figure 12:
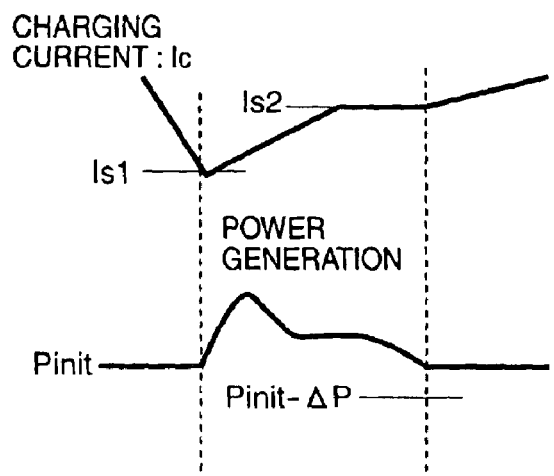
FIG. 12 is a diagram of assistance in explaining a transition of a charging current value and a variation of power generation in FIG. 11.

The following describes another power control related to the air conditioning unit 9 according to the present invention by using FIG. 11 and FIG. 12. In this case, the main control unit 8 controls the engine 2 so that the initial power generation of the power generator 4 is equal to an initial value Pinit in step S34 of a flowchart shown in FIG. 11. Next, the main control unit 8 determines whether a charging current value Ic to the in-vehicle battery 5 transmitted to the CAN as described above is lower than a given lower limit Is1 in step S35; if not, the control returns to the step S34. If the charging current value Ic is lower than the lower limit Is1 as shown in the upper part of FIG. 12, the main control unit 8 progresses to step S36 from the step S35 to calculate such an amount of power generation of the power generator 4 that the charging current value Ic to the in-vehicle battery 5 is equal to a given return value Is2 higher than the lower limit Is1 in accordance with a PI feedback operation of formula (F(Is2−Ic)).

Next, the main control unit 8 determines whether the power generation calculated in step S37 is lower than the upper limit of the power that the power generator 4 can generate Pmax; if so, the main control unit 8 progresses to step S38 to control the power generation of the power generator 4 to the value calculated in the step S36 and then progresses to step S40. On the other hand, if the power generation calculated in the step S36 is equal to or higher than the upper limit Pmax of the power generation of the power generator 4, the main control unit 8 progresses to step S39 from the step S37 to notify the air-conditioner control unit 28 of the air conditioning unit 9 that the power generation of the power generator 4 has reached the upper limit Pmax and then progresses to step S40. In response to it, the air-conditioner control unit 28 executes a control of preventing the power consumption to increase further or of controlling the compressor motor 11 for reducing the power consumption in the same manner as for the above, independently of the above basic passenger compartment air conditioning operation. In this case, the main control unit 8 can also reduce the power consumption of other electrical loads of the automobile 1 in the same manner as in the step S23.

If the charging current value Ic to the in-vehicle battery 5 gradually increases as shown in the upper part of FIG. 12 with the above control, the power generation of the power generator 4 also shifts from the initial rise to the decline in time as shown in the lower part of FIG. 12. If the power generation of the power generator 4 is equal to or higher than the initial value Pinit, however, the control returns to the step S36 to repeat the above. Then, if the power generation finally gets lower than the initial value (Pinit−ΔP) (ΔP: hysteresis), the main control unit 8 returns to the step S34 from the step S40 to return to the initial control with the initial value Pinit as the power generation of the power generator 4.

In this manner, if the charging current value Ic to the in-vehicle battery 5 is lower than the given lower limit Is1, the power generation of the power generator 4 is increased from the given initial value Pinit, by which charging the in-vehicle battery 5 is secured. This prevents the in-vehicle battery 5 from being uncharged due to power consumption of the air conditioning unit 9, thereby effectively eliminating the disadvantage of the traveling malfunction or disabled traveling caused by a decrease of a storage amount or discharging to the fullest of the in-vehicle battery 5.

In addition, the main control unit 8 controls the power generation of the power generator 4 so that the charging current value Ic rises up to a given return value Is2 higher than the lower limit Is1, while it brings the power generation of the power generator 4 back to the initial value Pinit if the power generation concerned drops to a value lower than the initial value Pinit, thereby securing charging for the in-vehicle battery 5 and eliminating the disadvantage of a decrease of a storage amount or discharging to the fullest of the in-vehicle battery 5 while the power generation of the power generator 4 is well controlled without trouble.

Furthermore, if the power generation of the power generator 4 reaches the upper limit Pmax, the air-conditioner control unit 28 executes controls of stopping the increase of the power consumption in the air conditioning unit 9 or of decreasing the power consumption concerned, thereby enabling the air conditioning capability of the air conditioning unit 9 to be secured as much as possible while it becomes possible to prevent the disadvantage reliably of the traveling malfunction or disabled traveling which may be caused by a decrease of a storage amount or discharging to the fullest of the in-vehicle battery 5 due to power consumption of the air conditioning unit 9.

Figure 13:
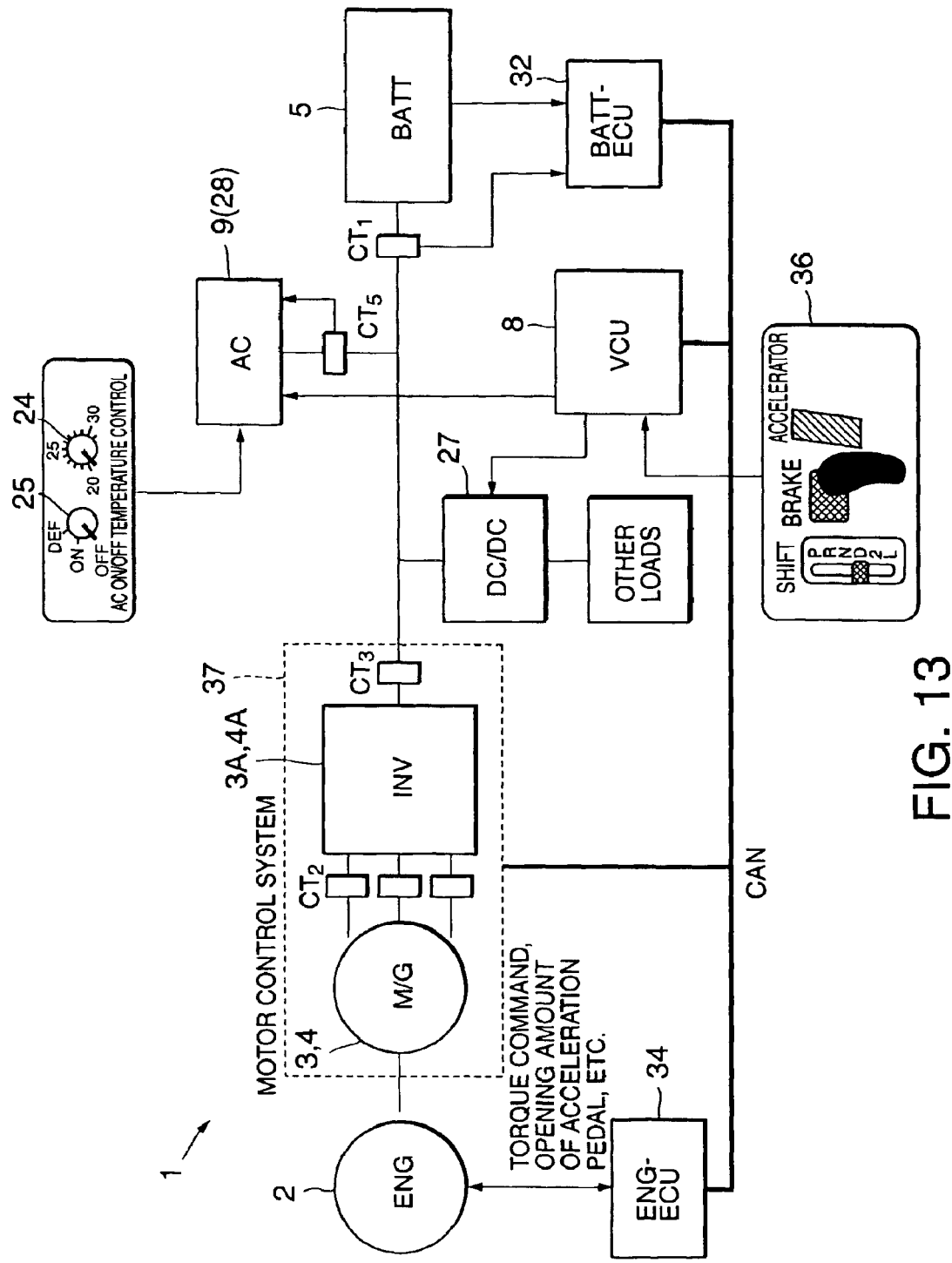
FIG. 13 is a block diagram of a block diagram of a control system of an automobile corresponding to FIG. 5 in a case where an air-conditioner control unit is not connected to a CAN.

While the air-conditioner control unit 28 of the air conditioning unit 9 is also connected to the CAN in the above embodiment, it is not limited to this, but the air-conditioner control unit 28 of the air conditioning unit 9 can be connected to the main control unit 8 via a signal line instead of being connected to the CAN as shown in FIG. 13. Note that in this case, however, the permissible power consumption increment ΔU is not calculated in the air-conditioner control unit 28, but the value calculated in the main control unit 8 is received for use.

Figure 14:
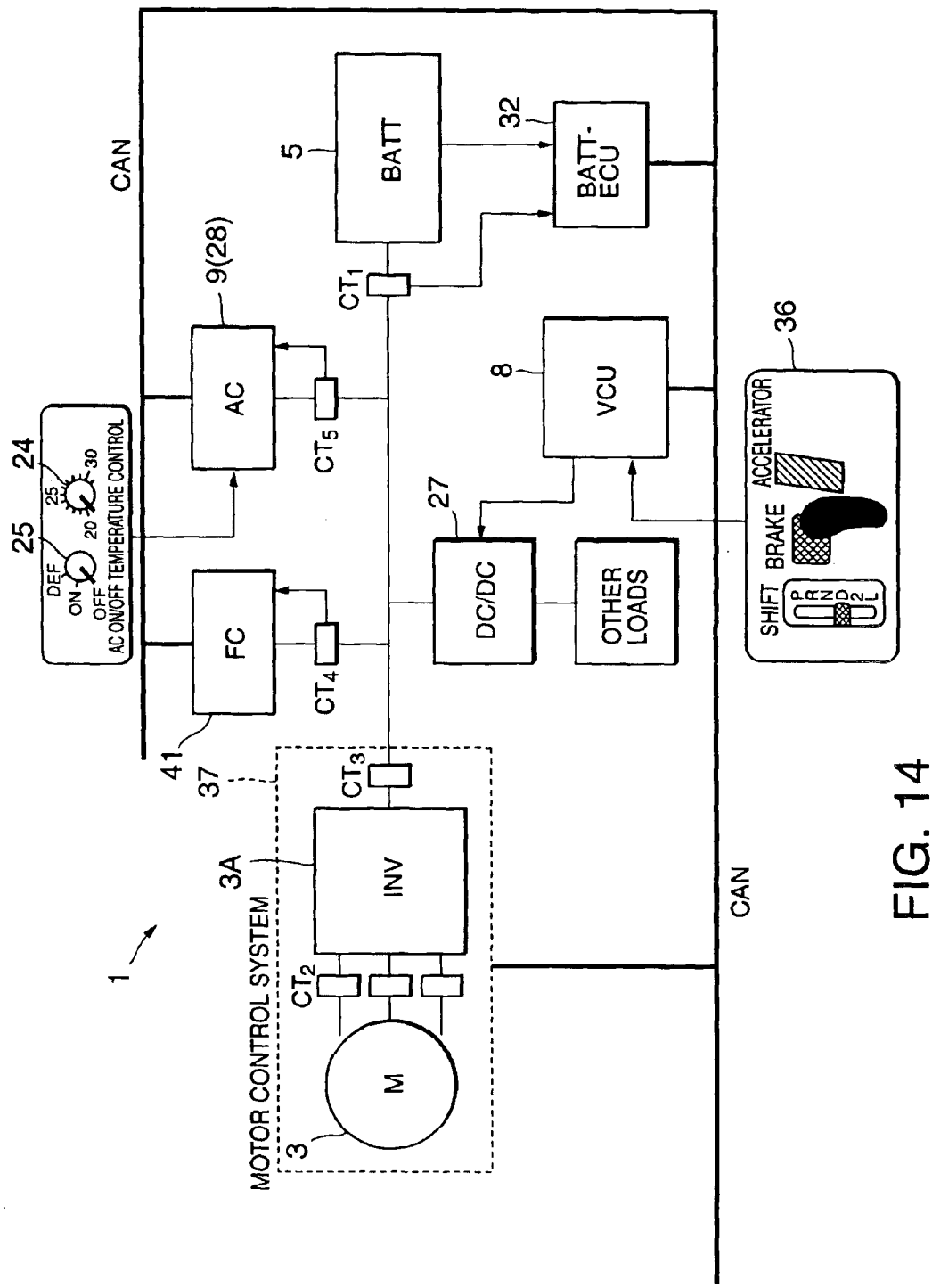
FIG. 14 is a block diagram of a control system of an automobile in a case where the automotive air conditioning system of the present invention is applied to a fuel cell powered vehicle.

In addition, while the present invention has been described by giving an example of a hybrid vehicle (HEV) as the automobile 1 in the above embodiment, it is not limited to this, but the present invention is also effective for a fuel cell powered vehicle (FCEV) as shown in FIG. 14. In this diagram, those designated by the same reference characters as in FIG. 1 to FIG. 5 have identical or similar functions; in this case, the traveling motor 3 is connected to the in-vehicle battery 5 via the motor control inverter 3A to establish the motor control system 37 and power is generated by the fuel cell (FC) 41. Then, the fuel battery 41 is connected to the in-vehicle battery 5 for charging.

Figure 15:
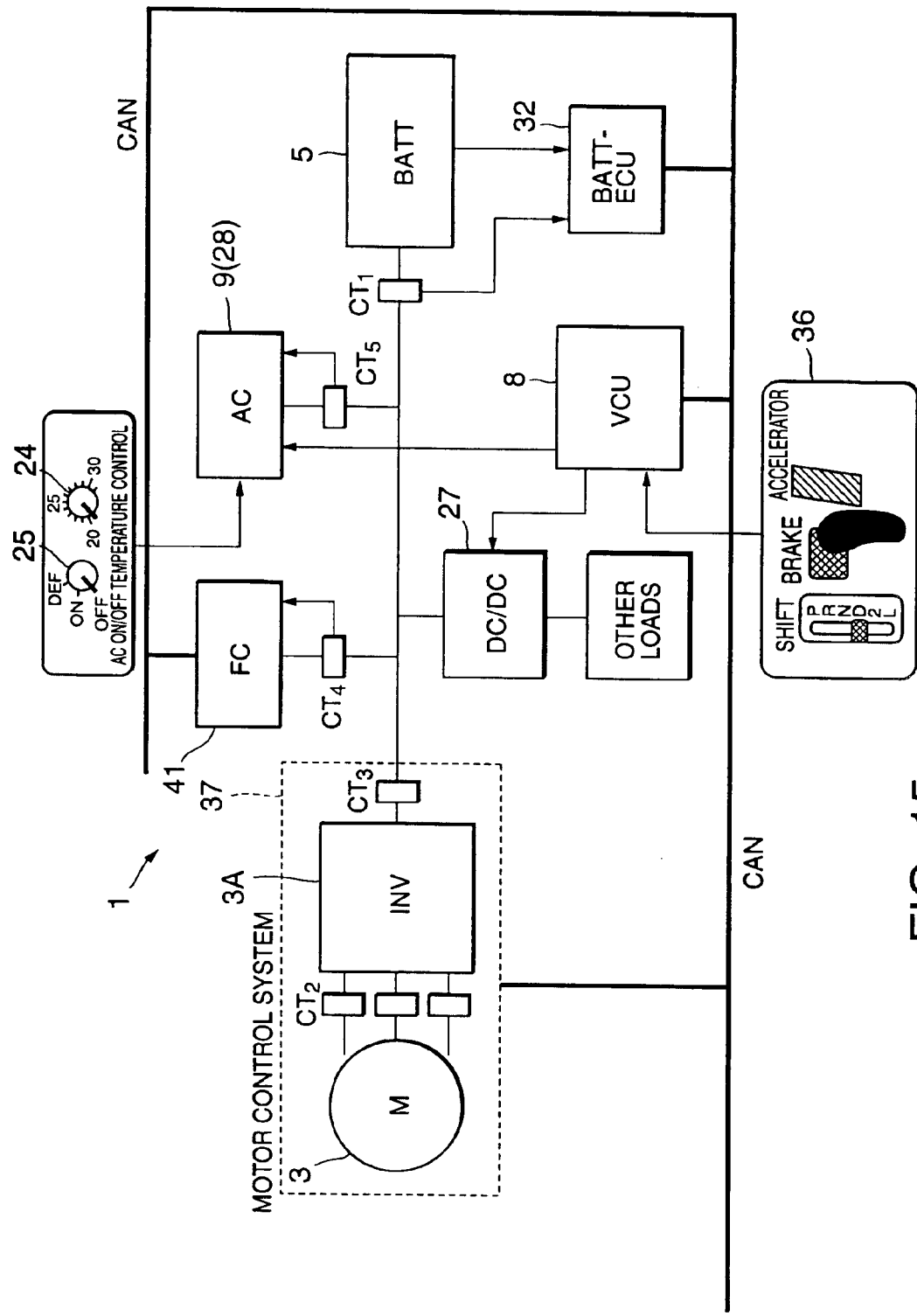
FIG. 15 is a block diagram of a control system of an automobile corresponding to FIG. 14 in a case where the air-conditioner control unit is not connected to the CAN.

Furthermore, the power generation current of the fuel cell 41 is detected by the current transformer CT4 and input to the fuel cell 41, and the detected current value is also transmitted to the CAN and the power generation of the fuel cell 41 is controlled in accordance with a command signal from the main control unit 8 via the CAN. Then, data of the permissible power generation increment ΔG in the fuel cell 41 is transmitted from the fuel cell 41 to the CAN in the same manner as for the above and data of the margin horsepower ΔH obtained by subtracting the current torque from the maximum torque curve of the traveling motor 3 can be transmitted from the motor control system 37 to the CAN, too. This enables the power controls related to the air conditioning unit 9 in the same manner as for the above hybrid vehicle. In the same manner as FIG. 13 in the above, FIG. 15 shows an example of an arrangement in which the air-conditioner control unit 28 of the air conditioning unit 9 is not connected to the CAN in FIG. 14.

Figure 16:
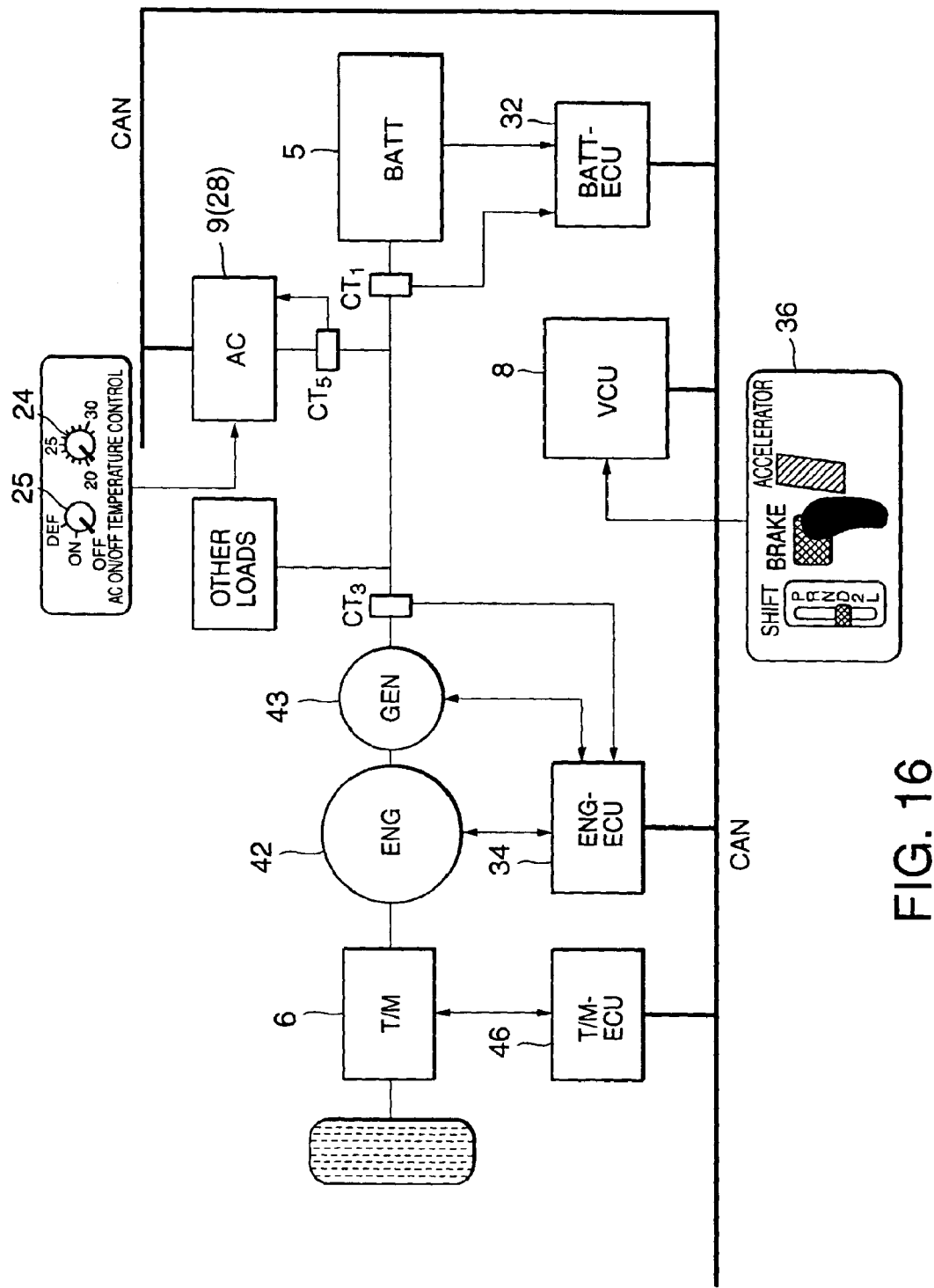
FIG. 16 is a block diagram of a control system of an automobile in a case where the automotive air conditioning system of the present invention is applied to a normal fuel engine vehicle.
Figure 17:
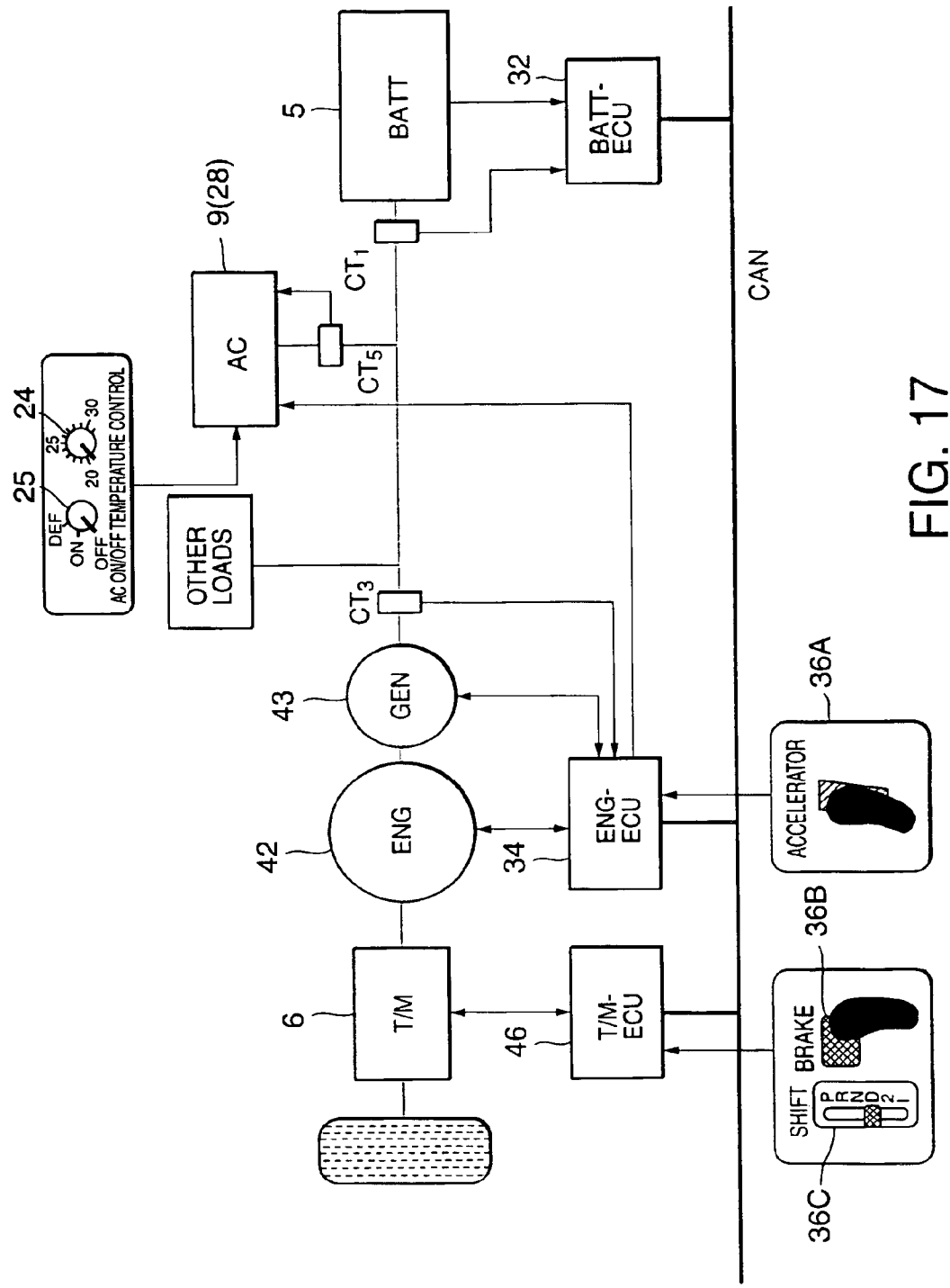
FIG. 17 is a block diagram of a control system of an automobile corresponding to FIG. 16 in a case where the air-conditioner control unit is not connected to the CAN.

The invention according to claims other than claim 13 is also applicable to a normal fuel engine vehicle as shown in FIG. 16. In this diagram, it is also assumed that those designated by the same reference characters as in FIG. 1 to FIG. 5 have identical or similar functions. In this case, the in-vehicle battery 5 (DC42V) is charged with power generated by the power generator (GEN) 43 driven by the traveling fuel engine (internal combustion engine) 42 and the air conditioning unit 9 is driven with the power of the in-vehicle battery 5. Then, the fuel engine 42 is controlled by the engine control unit 34 connected to the CAN and a detected value in the current transformer CT3 is input to the engine control unit 34, by which the power generation of the power generator 43 is also controlled. The margin power generation ΔG1 of the power generator 43 is calculated in the engine control unit 34 and its data is transmitted to the CAN. Data of the margin horsepower ΔH is also transmitted from the engine control unit 34 to the CAN. This enables the power control related to the air conditioning unit 9 in the same manner as for the above hybrid vehicle. Referring to FIG. 17, there is shown an example of an arrangement in which the air-conditioner control unit 28 of the air conditioning unit 9 is not connected to the CAN in FIG. 16 in the same manner as FIG. 13 and FIG. 15 in the above. It should be noted that, however, the main control unit 8 is not provided, but the engine control unit 34 serves as it and that a sensor for detecting a control amount of an accelerator 36A is connected to the engine control unit 34 and a sensor for detecting a control state of a brake 36B and a sensor for detecting a shift position of a shift lever 36C are connected to a change-gear control unit 46 directly.

The reference numeral 46, which designates the change-gear control unit for controlling the gearless drive mechanism 6, is connected to the CAN. If the power generation of the power generator 43 is enhanced by increasing the number of revolutions of the fuel engine 42, the change-gear control unit 46 executes a control of keeping a constant vehicle velocity by controlling a change gear ratio.

While the margin power generation ΔG1 is compared with the margin horsepower ΔH and a smaller one is considered to be the permissible power generation increment $\Delta G$ in the above embodiment, it is not limited to this, but such a control is effective in the invention according to claims 1, 2, and 5 that the margin power generation $\Delta G1$ is directly as the permissible power generation increment $\Delta G$. Furthermore, while the permissible power consumption increment $\Delta I$ is calculated by multiplying the permissible power generation increment $\Delta G$+the permissible discharging current increment $\Delta E$ by the margin-power utilization ratio $\alpha$, the value of the permissible power generation increment $\Delta G$+the permissible discharging current increment $\Delta E$ can be directly used as the permissible power consumption increment $\Delta I$ in the invention according to the claims 1, 2, and 3. Furthermore, there can be various types of the margin-power utilization ratio $\alpha$; it can fluctuate linearly in proportion to a value of the permissible power generation increment $\Delta G$ plus the permissible discharging current increment $\Delta E$ minus the margin horsepower $\Delta H$; it can be proportional to it in curve; or it can fluctuate in incremental steps. In any case, the margin-power utilization ratio $\alpha$ in the present invention is a value that increases or decreases in response to an increase or a decrease of a value, the permissible power generation increment $\Delta G$ plus the permissible discharging current increment $\Delta E$ minus the margin horsepower $\Delta H$ in the range of 0 to 1.

Furthermore, various current values or control signals in the embodiments can be transmitted in various communication systems; a serial communication, a parallel communication, an analog communication, a digital communication, or a switch signal. Physically they can be transmitted in both wire and wireless communications. Naturally, it is achieved in a communication system without the CAN.

Still further, in addition to the power controls in the above embodiments, if the discharging current value from the in-vehicle battery 5 is higher than the given permissible discharging current value, the main control unit 8 can switch forcibly from an outside air intake mode to an inside air circulation mode for an air circulation in the passenger compartment so as to reduce the cooling load in the passenger compartment. In this case, if there is any opening window, it can be forcibly closed; furthermore, in this condition, a passenger can be notified of an operation by voice or an indicator or these controls can be invalidated by manual switching.

As described in detail hereinabove, according to an automotive air conditioning system of the present invention, it is for use in an automobile having storage means, power generation means for charging the storage means, and air conditioning means having an electric compressor driven by feeding from the storage means and comprises control means for controlling power generation of the power generation means and an operation of the air conditioning means, wherein the control means calculates a permissible power consumption increment in the air conditioning means by adding a permissible power generation increment to a permissible discharging current increment on tha basis of the permissible power generation increment allowable in the power generation means and the permissible discharging current increment allowable in the storage means to increase power consumption of the air conditioning means within the range of the permissible power consumption increment and to increase power generation of the power generation means within the range of the permissible power generation increment according to an increment of power consumption of the air conditioning means, by which the increase of the power consumption of the air conditioning means is limited to remain within the range of the permissible power consumption increment calculated by adding the permissible discharging current increment in the storage means to the permissible power generation increment in the power generation means.

This prevents the disadvantage of the traveling malfunction or disabled traveling which may be caused by a decrease of a storage amount or discharging to the fullest of the storage means due to power consumption of the air conditioning means. In addition, power generation of the power generation means is increased within the range of the permissible power generation increment according to an increment of power consumption of the air conditioning means, thereby ensuring as high air conditioning capability of the air conditioning means as possible, by which a decrease of the air conditioning performance inside the passenger compartment can be prevented or minimized. Particularly, the permissible discharging current increment in the storage means is also considered in an increase of power consumption of the air conditioning means in this condition. Therefore, it becomes possible to discharge the storage means within the allowable range so as to maximize the air conditioning capability of the air conditioning means under such circumstances that traveling loads are reduced, thereby achieving more comfortable air conditioning in the passenger compartment.

Furthermore, according to an automotive air conditioning system of the present invention, it is for use in an automobile having storage means, power generation means for charging the storage means, and air conditioning means having an electric compressor driven by feeding from the storage means and comprises control means for controlling power generation of the power generation means and an operation of the air conditioning means, wherein the control means calculates a permissible power consumption increment in the air conditioning means by adding a permissible power generation increment to a permissible discharging current increment on tha basis of the permissible power generation increment allowable in the power generation means and the permissible discharging current increment allowable in the storage means to increase power consumption of the air conditioning means within the range of the permissible power consumption increment and to increase power generation of the power generation means by an excess of an increment of power consumption of the air conditioning means over the permissible discharging current increment, by which the increase of the power consumption of the air conditioning means is limited to remain within the range of the permissible power consumption increment calculated by adding the permissible discharging current increment in the storage means to the permissible power generation increment in the power generation means.

This prevents the disadvantage of the traveling malfunction or disabled traveling which may be caused by a decrease of a storage amount or discharging to the fullest of the storage means due to power consumption of the air conditioning means. In addition, power generation of the power generation means is increased by the excess of an increment of power consumption of the air conditioning means over the permissible discharging current increment, thereby ensuring as high air conditioning capability of the air conditioning means as possible, by which a decrease of the air conditioning performance inside the passenger compartment can be prevented or minimized. Particularly, the permissible discharging current increment in the storage means is also considered in an increase of power consumption of the air conditioning means in this condition. Therefore, it becomes possible to discharge the storage means within the allowable range so as to maximize the air conditioning capability of the air conditioning means under such circumstances that traveling loads are reduced, thereby achieving more comfortable air conditioning in the passenger compartment. Furthermore, the increase in the power generation is limited to the excess of an increment of power consumption of the air conditioning means over the permissible discharging current increment, by which it becomes possible to minimize the increase in the consumption energy for increasing the power generation in the power generation means.

According to the automotive air conditioning system of the present invention, it further comprises driving means for driving the power generation means in addition to the above each aspect of the invention, wherein the control means compares the margin power generation that the power generation means can output further with the margin horsepower that the driving means can output further and considers a lower value to be the permissible power generation increment, by which it becomes possible to calculate the permissible power consumption increment of the air conditioning means from a more accurate permissible power generation increment obtained after considering the margin horsepower of the driving means for driving the power generation means and to execute a control of an increase in the power consumption of the air conditioning means.

Furthermore, according to the automotive air conditioning system of the present invention, the control means further calculates a margin-power utilization ratio fluctuating within a range of 0 to 1 in proportion to a value obtained by subtracting the margin horsepower from a value of the permissible power generation increment plus the permissible discharging current increment and calculates the permissible power consumption increment by multiplying the permissible power generation increment plus the permissible discharging current increment by the margin-power utilization ratio, by which the permissible power consumption increment decreases if a proportion of the margin horsepower is high relative to the value of the permissible power generation increment plus the permissible discharging current increment and the margin-power utilization ratio is low, while the permissible power consumption increment increases if the proportion of the margin horsepower is low and the margin-power utilization ratio is high to the contrary.

With this, in a case where an output of the driving means for driving the power generation means sharply increases up to the maximum horsepower and the margin horsepower sharply decreases, the value of the permissible power consumption increment decreases in advance if it has a significant effect, thereby enabling an accurate control of the power consumption of the air conditioning means according to driving conditions of the driving means for driving the power generation means.

Furthermore, according to an automotive air conditioning system of the present invention, it is for use in an automobile having storage means, power generation means for charging the storage means, and air conditioning means having an electric compressor driven by feeding from the storage means and comprises control means for controlling power generation of the power generation means and an operation of the air conditioning means, wherein the control means calculates a permissible power generation increment allowable in the power generation means to increase power consumption of the air conditioning means within the range of the permissible power generation increment and to increase power generation of the power generation means according to an increment of power consumption of the air conditioning means, by which an increase of the power consumption of the air conditioning means is limited to remain at least within the range of the permissible power generation increment of the power generation means.

This prevents the disadvantage of the traveling malfunction or disabled traveling which may be caused by a decrease of a storage amount or discharging to the fullest of the storage means due to an electric discharge of the storage means caused by power consumption of the air conditioning means. In addition, power generation of the power generation means is increased according to an increment of power consumption of the air conditioning means, thereby ensuring as high air conditioning capability of the air conditioning means as possible, by which a decrease of the air conditioning performance inside the passenger compartment can be prevented or minimized.

According to the automotive air conditioning system of the present invention, it further comprises driving means for driving the power generation means in the above, wherein the control means compares margin power generation that the power generation means can output further with margin horsepower that the driving means can output further and considers a lower value to be the permissible power generation increment, by which it becomes possible to calculate a more accurate permissible power generation increment obtained after considering the margin horsepower of the driving means for driving the power generation means and to execute a control of an increase in the power consumption of the air conditioning means.

According to an automotive air conditioning system of the present invention, it is for use in an automobile having storage means, power generation means for charging the storage means, and air conditioning means having an electric compressor driven by feeding from the storage means and comprises current detecting means for detecting a discharging current value from the storage means and control means for controlling power generation of the power generation means, wherein, if the discharging current value exceeds a given permissible value, the control means increases the power generation of the power generation means from a given initial value on the basis of the discharging current value from the storage means detected by the current detecting means, thereby enabling an effective elimination of the disadvantage of the traveling malfunction or disabled traveling which may be caused by a decrease of a storage amount or discharging to the fullest of the storage means due to power consumption of the air conditioning means. Particularly, it causes the storage means to be discharged up to a permissible value, by which it becomes possible to discharge the storage means within the allowable range so as to maximize the air conditioning capability of the air conditioning means under the conditions of low traveling loads, thereby achieving more comfortable air conditioning in the passenger compartment.

According to the automotive air conditioning system of the present invention, the control means in the above further controls power generation of the power generation means so that the discharging current value decreases to a given return value lower than the permissible value and returns the power generation of the power generation means to the initial value if the power generation concerned decreases to a level lower than the initial value, thereby eliminating the disadvantage of a decrease of a storage amount or discharging to the fullest of the storage means while the power generation of the power generation means is controlled without any problem.

According to the automotive air conditioning system of the present invention, the control means in the above further controls an operation of the air conditioning means and executes a control of stopping an increase of power consumption of the air conditioning means or of decreasing the power consumption concerned if the power generation of the power generation means reaches an upper limit, by which it becomes possible to secure as large air conditioning capability of the air conditioning means as possible while it is possible to reliably prevent the disadvantage of the traveling malfunction or disabled traveling which may be caused by a decrease of a storage amount or discharging to the fullest of the storage means due to power consumption of the air conditioning means.

According to an automotive air conditioning system of the present invention, it is for use in an automobile having storage means, power generation means for charging the storage means, and air conditioning means having an electric compressor driven by feeding from the storage means and comprises current detecting means for detecting a charging current value to the storage means and control means for controlling power generation of the power generation means, wherein, if the charging current value concerned is lower than a given lower limit, the control means increases the power generation of the power generation means from a given initial value on the basis of the charging current value to the storage means detected by the current detecting means, thereby ensuring charging the storage means. This prevents the storage means to be uncharged due to power consumption of the air conditioning means, thereby effectively eliminating the disadvantage of the traveling malfunction or disabled traveling which may be caused by a decrease of a storage amount or discharging to the fullest of the storage means.

According to the automotive air conditioning system of the present invention, the control means in the above further controls power generation of the power generation means so that the charging current value increases to a given return value higher than the lower limit and returns the power generation of the power generation means to the initial value if the power generation concerned decreases to a level lower than the initial value, thereby ensuring charging the storage means and eliminating the disadvantage of a decrease of a storage amount or discharging to the fullest of the storage means while the power generation of the power generation means is controlled without any problem.

According to the automotive air conditioning system of the present invention, the control means in the above further controls an operation of the air conditioning means and executes a control of stopping an increase of power consumption of the air conditioning means or of decreasing the power consumption concerned if the power generation of the power generation means reaches an upper limit, by which it becomes possible to secure as large air conditioning capability of the air conditioning means as possible while it is possible to reliably prevent the disadvantage of the traveling malfunction or disabled traveling which may be caused by a decrease of a storage amount or discharging to the fullest of the storage means due to power consumption of the air conditioning means.

According to the automotive air conditioning system of the present invention, the automobile in each of the above is an electric vehicle running with a traveling motor fed by the storage means in each aspect of the invention, by which it is possible to eliminate an adverse effect of the operation of the air conditioning means on traveling of the electric vehicle effectively while the air conditioning means smoothly performs air conditioning in the passenger compartment of the electric vehicle.

What is claimed is:

1. An automotive air conditioning system for use in an automobile having storage means, power generation means for charging the storage means, and air conditioning means having an electric compressor driven by feeding from said storage means, comprising:

control means for controlling power generation of said power generation means and an operation of said air conditioning means, wherein said control means calculates a permissible power consumption increment in said air conditioning means by adding a permissible power generation increment to a permissible discharging current increment on the basis of the permissible power generation increment allowable in said power generation means and the permissible discharging current increment allowable in said storage means to increase power consumption of said air conditioning means within the range of the permissible power consumption increment and to increase power generation of said power generation means within the range of the permissible power consumption of the air conditioning means concerned.

2. An automotive air conditioning system for use in an automobile having storage means, power generation means for charging the storage means, and air conditioning means having an electric compressor driven by feeding from said storage means, comprising:

control means for controlling power generation of said power generation means and an operation of said air conditioning means, wherein said control means calculates a permissible power consumption increment in said air conditioning means by adding a permissible power generation increment to a permissible discharging current increment on the basis of the permissible power generation increment allowable in said power generation means and the permissible discharging current increment allowable in said storage means to increase power consumption of said air conditioning means within the range of the permissible power consumption increment and to increase power generation of said power generation means by an excess of an increment of power consumption of said air conditioning means concerned over the permissible discharging current increment.

3. The system according to claim 1 or 2, further comprising driving means for driving said power generation means, wherein said control means compares the margin power generation that said power generation means can output further with the margin horsepower that said driving means can output further and considers a lower value to be the permissible power generation increment.

4. The system according to claim 3, wherein said control means calculates a margin-power utilization ratio fluctuating within a range of 0 to 1 in proportion to a value obtained by subtracting the margin horsepower from a value of the permissible power generation increment plus the permissible discharging current increment, and wherein said control means calculates the permissible power consumption increment by multiplying the permissible power generation increment plus the permissible discharging current increment by the margin-power utilization ratio.

5. An automotive air conditioning system for use in an automobile having storage means, power generation means for charging the storage means, and air conditioning means having an electric compressor driven by feeding from the storage means, comprising:

control means for controlling power generation of said power generation means and an operation of said air conditioning means, wherein said control means calculates a permissible power generation increment allowable in said power generation means to increase power consumption of said air conditioning means within the range of the permissible power generation increment and to increase power generation of said power generation means according to an increment of power consumption of the air conditioning means concerned.

6. The system according to claim 5, further comprising driving means for driving said power generation means, wherein said control means compares margin power generation that said power generation means can output further with margin horsepower that said driving means can output further and considers a lower value to be the permissible power generation increment.

7. An automotive air conditioning system for use in an automobile having storage means, power generation means for charging the storage means, and air conditioning means having an electric compressor driven by feeding from the storage means, comprising:

current detecting means for detecting a discharging current value from said storage means and control means for controlling power generation of said power generation means, wherein, if the discharging current value exceeds a given permissible value, said control means increases the power generation of said power generation means from a given initial value on the basis of the discharging current value from the storage means detected by the current detecting means.

8. The system according to claim 7, wherein said control means controls power generation of said power generation means so that the discharging current value decreases to a given return value lower than the permissible value and returns the power generation of said power generation means to the initial value if the power generation concerned decreases to a level lower than the initial value.

9. The system according to claim 7 or 8, wherein said control means controls an operation of said air conditioning means and executes a control of stopping an increase of power consumption of said air conditioning means or of decreasing the power consumption concerned if the power generation of said power generation means reaches an upper limit.

10. An automotive air conditioning system for use in an automobile having storage means, power generation means for charging the storage means, and air conditioning means having an electric compressor driven by feeding from said storage means, comprising:

current detecting means for detecting a charging current value to said storage means and control means for controlling power generation of said power generation means, wherein, if the charging current value concerned is lower than a given lower limit, said control means increases the power generation of said power generation means from a given initial value on the basis of the charging current value to said storage means detected by said current detecting means.

11. The system according to claim 10, wherein said control means controls power generation of said power generation means so that the charging current value increases to a given return value higher than the lower limit and returns the power generation of said power generation means to the initial value if the power generation concerned decreases to a level lower than the initial value.

12. The system according to claim 10 or 11, wherein said control means controls an operation of said air conditioning means and executes a control of stopping an increase of power consumption of said air conditioning means or of decreasing the power consumption concerned if the power generation of said power generation means reaches an upper limit.

13. The system according to claim 1, 2, 5, 6, 7, 8, 10, or 11, wherein said automobile is an electric vehicle running with a traveling motor fed by said storage means.

* * * * *